(12) United States Patent
Miyata et al.

(10) Patent No.: US 6,366,376 B1
(45) Date of Patent: Apr. 2, 2002

(54) OPTICAL TRANSMITTING DEVICE USING WAVELENGTH DIVISION MULTIPLEXING TO TRANSMIT SIGNAL LIGHTS HAVING FREQUENCIES ARRANGED TO ELIMINATE EFFECTS OF FOUR-WAVE MIXING (FWM)

(75) Inventors: Hideyuki Miyata; Hiroshi Onaka; Terumi Chikama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/223,563

(22) Filed: Dec. 31, 1998

Related U.S. Application Data

(63) Continuation of application No. 08/801,917, filed on Feb. 14, 1997.

(30) Foreign Application Priority Data

Mar. 8, 1996 (JP) .............................................. 8-051803

(51) Int. Cl.[7] .............................................. H04J 14/02
(52) U.S. Cl. ...................... 359/124; 359/133; 359/161
(58) Field of Search ................. 359/124, 133, 359/173, 161

(56) References Cited

U.S. PATENT DOCUMENTS 5,589,969 A * 12/1996 Taga et al. .................. 359/124
5,696,614 A * 12/1997 Ishikawa et al. ............ 359/124
6,118,563 A * 9/2000 Boskovic et al. ........... 359/124

OTHER PUBLICATIONS

Forghieri et al., "Reduction of Four–Wave Mixing Crosstalk in WDM Systems Using Unequally Spaced Channels", IEEE Photonics Technology Letters, vol.6, No.6, Jun. 1994. pp. 154–156.*

* cited by examiner

Primary Examiner—Kinfe-Michael Negash
(74) Attorney, Agent, or Firm—Staas & Halsey LLP

(57) ABSTRACT

An optical transmitting device which combines a plurality of signal lights, each having a different, corresponding, frequency, into a wavelength division multiplexed signal light. The frequencies are spaced apart from each other in a manner with eliminates the effects of four-wave mixing (FWM). More specifically, the difference in frequencies of any pair-combination of the signal lights is different from the difference in frequencies between any other pair-combination of the signal lights. Moreover, the plurality of signal lights include n signal lights having respectively corresponding frequencies $f_1$ through $f_n$ arranged in order from $f_1$ to $f_n$ along a frequency spectrum, where frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies. $m_1$ through $m_{n-1}$ are all different from each other. In addition, $m_1$ through $m_{n-1}$ and the sum of any consecutive (n−2) spacing coefficients $m_1$ through $m_{n-1}$ should all be different from each other. The sum of $m_1$ through $m_{n-1}$ can be minimized to minimize required bandwidth.

122 Claims, 9 Drawing Sheets

OPTICAL TRANSMITTING DEVICE USING WAVELENGTH DIVISION MULTIPLEXING TO TRANSMIT SIGNAL LIGHTS HAVING FREQUENCIES ARRANGED TO ELIMINATE EFFECTS OF FOUR-WAVE MIXING (FWM)

CROSS-REFERENCE TO RELATED APPLICATIONS

This application is a coninuation of Ser. No. 08/801,917 Feb. 14, 1997.

This application is based on, and claims priority to, Japanese patent application number 08-51803, filed on Mar. 8, 1996, in Japan, and which is incorporated herein by reference.

BACKGROUND OF THE INVENTION

1. Field of the Invention

The present invention relates to the an optical communication system which combines a plurality of signal lights into a wavelength division multiplexed signal light for transmission through an optical fiber transmission line. More particularly, the present invention relates to an arrangement of frequencies of the signal lights to eliminate the effects of four-wave mixing (FWM).

2. Description of the Related Art

Optical communication systems can provide long-distance, large capacity transmission. Therefore, such optical communication systems will likely be used for future multimedia networks which require these characteristics.

Various techniques are being studied for increasing the capacity of optical communication systems. Such techniques include the use of time-division multiplexing (TDM), optical time-division multiplexing (OTDM) and wavelength-division multiplexing (WDM). Of these techniques, WDM is considered the most advantageous, since the transmission speed for each optical carrier signal light can be set at a lower value for the same transmission capacity, thereby resulting in greater tolerance to wavelength dispersion and nonlinear optical effects of an optical fiber transmission line.

Moreover, the development of erbium-doped fiber amplifiers (EDFA) having a wide "gain region" (that is, a wavelength region where a desired gain is obtained) has allowed optical communication systems to sufficiently amplify wavelength division multiplexed signals, thereby increasing the use of WDM. It is hopeful that WDM will allow optical communication systems to provide a flexible lightwave network in which cross connects, branching, insertion, and multiplexing of different kinds of services can be performed at optical levels by utilizing the wide gain region of an EDFA.

However, waveform degradation caused by wavelength dispersion of an optical fiber becomes significant in optical communication systems where the transmission speed for each optical carrier signal light exceeds several gigabits per second. Moreover, with long-distance transmission, input power to an optical fiber transmission line must be increased to obtain a required signal-to-noise ratio (SNR). Unfortunately, this increase causes an increase of self-phase modulation (SPM), a nonlinear optical effect in optical fibers.

SPM causes many problems. For example, wavelength chirping of signal light by SPM causes waveform degradation through interaction with the group velocity dispersion (GVD) of an optical fiber, thereby providing an SPM-GVD effect. To eliminate or suppress the SPM-GVD effect, a dispersion-shifted fiber (DSF) at 1.55, $\mu$m can be used as an optical fiber transmission line to minimize the dispersion value at signal light wavelength. However, in WDM transmission using the low-dispersion region of the DSF, the occurrence of a nonlinear optical effect in optical fiber, known as four-wave mixing (FWM) between signal lights, will become noticeable. The effect of FWM manifests itself in the form of crosstalk and attenuation. More specifically, crosstalk is caused by the selection and reception of FWM light together with the signal wavelength. Attenuation of the signal light is caused by energy transfer to the FWM light. Crosstalk and attenuation degrade SNR, and, in the worst case, make transmission impossible.

The occurrence efficiency of FWM increases as the transmission channel dispersion decreases, signal light power increases, wavelength separation reduces, or the number of wavelengths increases. Since FWM occurs at a lower power level than other nonlinear optical effects, the effects of FWM tend to easily occur. In reality, the effects of FWM increase because signal light power must be increased by using a low-dispersion region of a DSF transmission line and transmissions must be performed using closer channel spacing due to the limited signal band resulting from the wavelength-dependence of optical components and the gain region of optical amplifiers. Accordingly, sufficient consideration must be given to the effects of FWM in designing a WDM system.

Various methods have been proposed to suppress FWM. Such methods include separating the signal band substantially away from the zero dispersion wavelength $\lambda_o$ of an optical fiber transmission line (H. Miyata et al., "Study on the Effects of FWM in WDM Transmission Considering Fiber Dispersion Variations", Technical Report, The Institute of Electronics, Information and Communication Engineers, SSE93-143, OCS93-73 (1994-03); N. S. Bergano et al., "100 Gb/s WDM Transmission of Twenty 5 Gb/s NRZ Data Channels Over Trcosoceanic Distances Using a Gain Flattened Amplifier Chain", Proc. 21st Enr. Conf. on Opt. Comm. (ECOC '95—Brussels)). However, with this method, the signal band may undesireably shift from the gain region of optical amplifiers. Also, the zero dispersion wavelength $\lambda_o$ must be managed with high accuracy. Further, dispersion compensation becomes necessary for long-distance transmission because fiber dispersion increases.

SUMMARY OF THE INVENTION

Accordingly, it is an object of the present invention to provide a WDM optical communication system that can substantially eliminate or suppress the effects of FWM.

Additional objects and advantages of the invention will be set forth in part in the description which follows, and, in part, will be obvious from the description, or may be learned by practice of the invention.

Objects of the present invention are achieved by providing an optical transmitting device which combines a plurality of signal lights, each having a different, corresponding, frequency, into a wavelength division multiplexed signal light. For at least three signal lights of the plurality of signal lights, the difference in frequencies of any pair-combination of the at least three signal lights is different from the difference in frequencies between any other pair-combination of the at least three signal lights.

Moreover, objects of the present invention are achieved by providing the at least three signal lights to include n signal lights having respectively corresponding frequencies $f_1$ through $f_n$ arranged in order from $f_1$ to $f_n$ along a frequency spectrum, where frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies. $m_1$ through $m_{n-1}$ should all be different from each other. In addition, $m_1$ through $m_{n-1}$ and the sum of any consecutive (n−2) spacing coefficients $m_1$ through $m_{n-1}$ should all be different from each other. $m_1$ through $m_{n-1}$ should be selected to minimize the sum of $m_1$ through $m_{n-1}$, and thereby reduce the required bandwidth.

Objects of the present invention are also achieved by providing an optical transmitting device for combining first, second and third signal lights, each having a different, corresponding, frequency, into a wavelength division multiplexed signal light. The difference in frequencies of any pair-combination of the first, second and third signal lights is different from the difference in frequencies between any other pair-combination of the first, second and third signal lights.

Moreover, objects of the present invention are achieved by providing the first, second and third signal lights so that the first, second and third signal lights have frequencies $f_1$, $f_2$ and $f_3$, respectively, arranged in order from $f_1$ to $f_3$ along a frequency spectrum, where frequencies $f_1$ and $f_2$ have respectively corresponding integer spacing coefficients $m_1$ and $m_2$, frequency $f_2$ is separated by $m_1 \cdot \Delta f_{S-F}$ from frequency $f_1$, and frequency $f_3$ is separated by $m_2 \cdot \Delta f_{S-F}$ from frequency $f_2$. $\Delta f_{S-F}$ is a unit of spacing between frequencies. $m_1$ and $m_2$ are different from each other.

In addition, objects of the present invention are achieved by providing an optical transmitting device for combining a plurality of signal lights, each having a different, corresponding, frequency, into a wavelength division multiplexed signal light. The frequencies of a first arbitrary pair of signal lights of the plurality of signal lights have a frequency difference defined as a first frequency difference. The frequencies of a second arbitrary pair of signal lights of the plurality of signal lights, and different from the first arbitrary pair, have a frequency difference defined as a second frequency difference. The absolute value of the first frequency difference is different from the absolute value of second frequency difference.

Objects of the present invention are further achieved by providing an optical communication system which includes transmitters, a multiplexing device, an optical fiber transmission line, a demultiplexing device and a receiver. The transmitters produce signal lights, each signal light having a different, corresponding, frequency. The multiplexing device combines the signal lights into a wavelength division multiplexed signal light. The optical fiber transmission line receives the wavelength division multiplexed signal light from the multiplexing device and propagates the wavelength division multiplexed signal therethrough. The demultiplexing device receives the wavelength division multiplexed signal light from the optical fiber transmission line and demultiplexes the received wavelength division multiplexed signal light into individual signal lights. The receiver receives at least one of the individual signal lights from the demultiplexing device. For at least three signal lights of the plurality of signal lights produced by the transmitters, the difference in frequencies of any pair-combination of the at least three signal lights is different from the difference in frequencies between any other pair-combination of the at least three signal lights.

Objects of the present invention are also achieved by providing a method which includes the steps of: (a) providing a plurality of signal lights, each having a different, corresponding, frequency, wherein, for at least three signal lights of the plurality of signal lights, the difference in frequencies of any pair-combination of the at least three signal lights is different from the difference in frequencies between any other pair-combination of the at least three signal lights, and (b) combining the at least three signal lights into a wavelength division multiplexed signal light.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
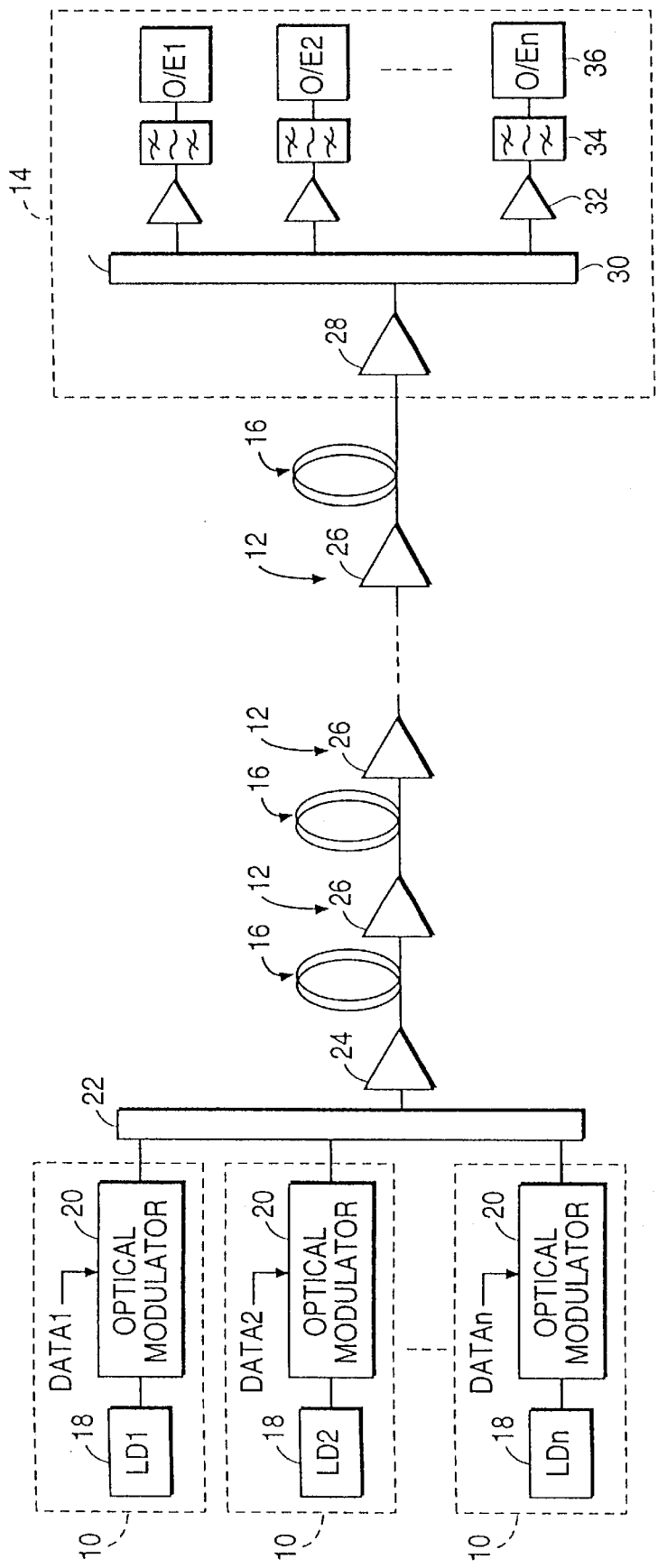
FIG. 1 is a block diagram illustrating a wavelength-division multiplexing optical communication system, according to an embodiment of the present invention.

Reference will now be made in detail to the present preferred embodiments of the present invention, examples of which are illustrated in the accompanying drawings, wherein like reference numerals refer to like elements throughout.

FIG. 1 is a block diagram illustrating a wavelength-division multiplexing optical communication system, according to an embodiment of the present invention. Referring now to FIG. 1, the optical communication system includes n optical transmitter 10. Each optical transmitter 10 includes a corresponding laser diode (LD) 18 which produces light at a corresponding frequency that is different from the frequency of light produced by the other laser diodes. Thus, the n optical transmitters 10 transmit signal lights at a frequencies $f_1$, $f_2$, . . . , $f_n$, respectively, and corresponding to n different channels.

Each of the n optical transmitters 10 includes a corresponding optical modulator 20 for modulating the transmitted signal light with transmission data DATAn. Thus, a first optical modulator 20 modulates the signal light of a first optical transmitter 10 with transmission data DATA1, and an nth optical modulator 20 modulates the signal light of an nth optical transmitter 10 with transmission data DATAn. Therefore, the optical communication system provides n channels for transmitting data.

The signal lights transmitted by optical transmitters 10 are combined into a wavelength division multiplexed signal light (WDM signal light) by a wavelength division multiplexer 22. The WDM signal light is provided to a dispersion shifted fiber (DSF) 16 functioning as an optical fiber transmission line. The WDM signal light output from wavelength division multiplexer 22 is amplified by a post-amplifier 24.

A plurality of optical repeaters 12 each include a corresponding optical amplifier 26. As the WDM signal light propagates through DSF 16, the WDM signal light is amplified by amplifiers 26.

An optical receiver 14 includes an optical preamplifier 28, an optical coupler 30, n optical amplifiers 32, n optical filters 34 and n optical detectors (optical to electrical, or O/E) 36. Optical preamplifier 28 amplifies the WDM signal light transmitted through DSF 16. Optical coupler 30 is a demultiplexer which splits the amplified WDM signal light into n outputs. Optical amplifiers 32 amplify the n outputs of optical coupler 30. The n optical filters 34 have center light frequencies of $f_1$, $f_2$, . . . , $f_n$, respectively, for filtering the n outputs amplified by optical amplifiers 32. Optical detectors 36 convert the outputs of optical filters 34 into electrical signals.

FWM is a phenomenon in which three wave signals multiplexed together and input into a fiber cause a fourth light to be undesireably generated by a third-order nonlinear susceptibility $X_{1111}$ of the fiber. More specifically, when signals with light frequencies of $f_1$, $f_2$, and $f_3$ are input into a fiber, FWM light occurs at light frequency $f_{ijk}$ that satisfies the following Equation (1).

$$f_{ijk} = f_i + f_j - f_k \ (i, j, k=1 \text{ to } 3, i \neq k, j \neq k) \qquad \text{Equation (1)}$$

Therefore, in an optical communication system with many channels $f_1$ to $f_n$, such as shown in FIG. 1, FWM light occurs by a combination of three arbitrary waves i, j, and k. When the channels are equally spaced apart, many FWM lights occur at the same light frequency positions in superimposing fashion by combinations of i, j, and k, thereby resulting in a worst-case crosstalk situation.

Figure 2:
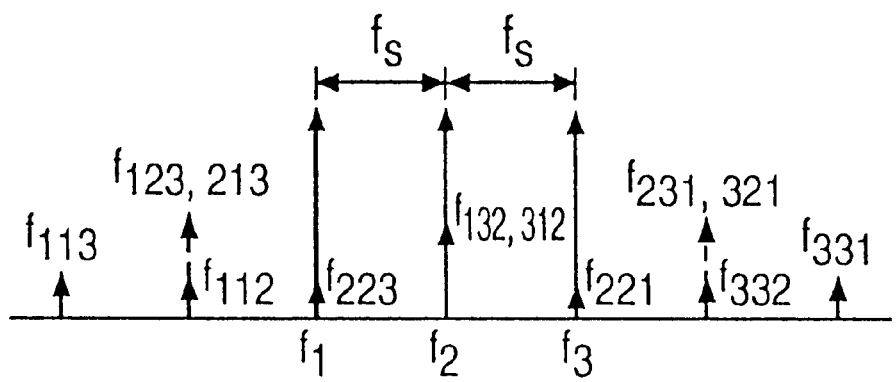
FIG. 2 is a diagram illustrating the effect of crosstalk by FWM in the case of an equally spaced arrangement.

FIG. 2 is a diagram illustrating the effect of crosstalk by FWM when the channels are equally spaced apart. More specifically, FIG. 2 illustrates the occurrence of FWM lights when three channels $f_1$, $f_2$ and $f_3$, are spaced at equal intervals, $f_s$. As illustrated in FIG. 2, nine (9) FWM lights occur, three of which coincide with the signal light, resulting in crosstalk. More specifically, the following nine (9) FWM lights occur: (1) $f_{113}$; (2) $f_{123}$, $f_{213}$; (3) $f_{112}$; (4) $f_{223}$; (5) $f_{132}$, $f_{312}$; (6) $f_{221}$; (7) $f_{231}$, $f_{321}$; (8) $f_{332}$; and (9) $f_{331}$. Of these, as illustrated in FIG. 2, FWM light (4) $f_{223}$ coincides with signal light $f_1$, FWM light (5) $f_{132}$, $f_{312}$ coincides with signal light $f_2$, and FWM light (6) $f_{221}$ coincides with signal light $f_3$.

According to the embodiments of the present invention, as will be described in more detail below, the channels (or frequencies of the signal lights) are arranged at unequally spaced intervals so that the resulting FWM lights will not be superimposed on any of the channels, thereby eliminating crosstalk caused by FWM.

Moreover, according to embodiments of the present invention, as discussed in more detail below, the arrangement of the channels is optimized in a manner which minimizes the signal band expansion occurring as a result of unequal spacing. Generally, the signal band of the optical communication system is limited by factors such as the wavelength dependance of optical components (including, for example, wavelength division multiplexer 22, optical coupler 30, and other components illustrated in FIG. 1), and the gain regions of post amplifiers 24 (see FIG. 1), optical amplifiers 26 (see FIG. 1), and optical preamplifier 28 (see FIG. 1).

The following Equation (2) is obtained by rearranging Equation (1).

$$f_{ijk} - f_j = f_i - f_k \qquad \text{Equation (2)}$$

From Equation (2), it can be seen that to secure a separation $\Delta f_{S-F}$ between FWM light and signal light, a light frequency separation difference of $\Delta f_{S-F}$ should be provided between a light frequency difference in an arbitrary pair of signal lights and a light frequency difference in another arbitrary pair of signal lights.

More specifically, a light frequency difference that is equal to or larger than the light frequency separation difference $\Delta f_{S-F}$ should exist between two light frequency differences, one of which is a difference in an arbitrary pair of signal lights, and the other of which is a difference in another arbitrary pair of signal lights. For example, in a case of three light frequencies $f_1$, $f_2$ and $f_3$, then $||f_1-f_2|-|f_2-f_3||$, $||f_1-f_3|-|f_1-f_2||$, and $||f_1-f_3|-|f_2-f_3||$, should all be equal to or larger than $\Delta f_{S-F}$, where $|x|$ represents the absolute value of x.

Figure 3:
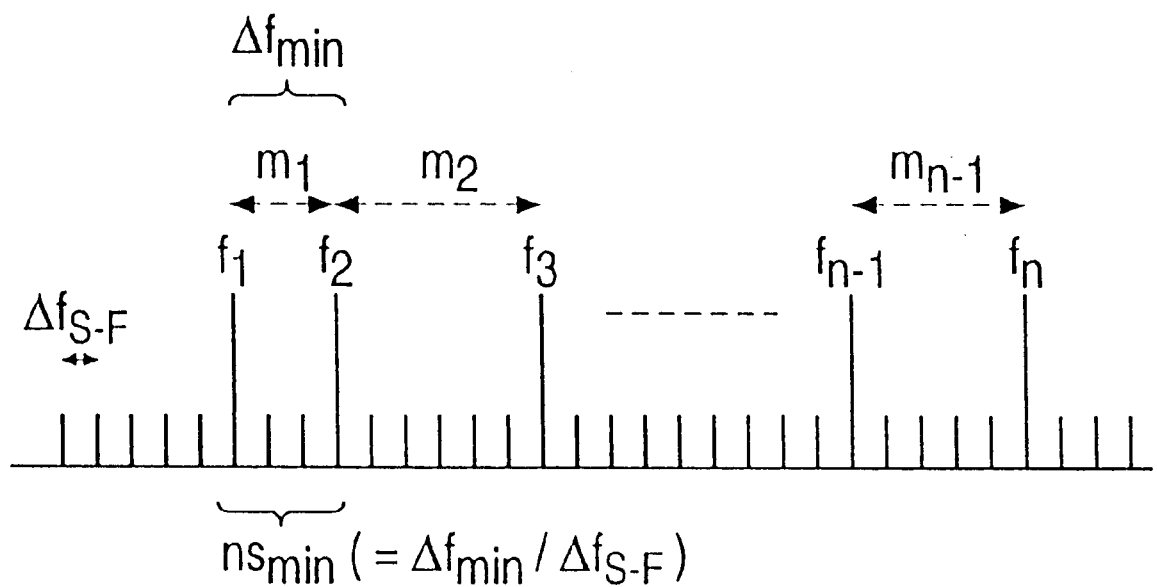
FIG. 3 is a diagram illustrating a spacing arrangement between channels of a wavelength division multiplexing optical communication system, according to an embodiment of the present invention.

FIG. 3 is a diagram illustrating a spacing arrangement between channels of a wavelength division multiplexing optical communication system, according to an embodiment of the present invention. Referring now to FIG. 3, a plurality of slots are set at intervals of $\Delta f_{S-F}$ (hereafter referred to as the "slot spacing"). Thus, $\Delta f_{S-F}$ can be considered to be a unit of spacing between frequencies. Here, it is assumed that each of the signal lights $f_1$ to $f_n$ is located in one of the slots. In this case, from Equation (1), each FWM light also is located in one of the slots. As shown in FIG. 3, signal lights $f_1$ to $f_{n-1}$ have corresponding spacing coefficients $m_1$ to $m_{n-3}$, respectively. For each signal light $f_1$ to $f_{n-1}$, the next successive signal light is spaced away by a distance equal to the corresponding spacing coefficient times the slot spacing. Therefore, for example, signal light $f_2$ is spaced a distance of $m_1 \cdot \Delta f_{S-F}$ from signal light $f_1$. Similarly, signal light $f_n$ is spaced a distance of $m_{n-1} \cdot \Delta f_{S-F}$ from signal light $f_{n-1}$.

Therefore, in other words, the spacing between the light frequencies $f_i$ and $f_{i+1}$. (i=1 to n-1) is set $m_i$ times the slot spacing $\Delta f_{S-F}$. More, according to the embodiments of the present invention, $m_1$ through $m_{n-1}$ are determined so that $m_1$ through $m_{n-1}$ and the sum of a consecutive (n-2) or less m (i.e., $m_1+m_2$, $m_2+m_3$, ..., $m_2+m_3+\ldots m_{n-1}$) are all different from one another. If this condition is met, the separation of $\Delta f_{S-F}$ can be secured between FWM light and signal light. Further, if the sum of all $m_i$ is held to a minimum, the required bandwidth is minimized.

For example, assume n=5. Therefore, there would be four (4) spacing coefficients $m_1$, $m_2$, $m_3$ and $m_4$. Then, according to the embodiments of the present invention, $m_1$, $m_2$, $m_3$, $m_4$, $(m_1+m_2)$, $(m_2+m_3)$, $(m_3+m_4)$, $(m_1+m_2+m_3)$, and $(m_2+m_3+m_4)$ each correspond to a difference between an arbitrary pair of signal lights and, therefore, should each be different from one another. Thus, for example, $m_1$ should not be equal to $m_2+m_3$, and $m_2+m_3+m_4$ should not be equal to $m_1+m_2+m_3$.

Moreover, for example, assume that spacing coefficients $m_1$, $m_2$, $m_3$ and $m_4$ equal 1, 4, 2 and 3, respectively. In this example, spacing coefficients $m_1$, $m_2$, $m_3$ and $m_4$ are all different from each other, but $m_1+m_2$ is equal to $m_3+m_4$. Therefore, $(m_1+m_2) \cdot \Delta f_{S-F}=(f_2-f_1)+(f_3-f_2)=f_3-f_1$. This becomes equal to $(m_3+m_4) \cdot f_{S-F}=(f_4-f_3)+(f_5-f_4)=f_5-f_3$. In this case, and FWM light $f_{153}=(f_1+f_5-f_3)$ coincides with $f_3$ since $(f_3-f_1)$ is equal to $(f_5-f_3)$ Therefore, according to the above embodiments of the present invention, an optical transmitting device combines a plurality of signal lights, each having a different, corresponding, frequency, into a wavelength division multiplexed signal light. The difference in frequencies of any pair-combination of the signal lights is different from the difference in frequencies between any other pair-combination of the signal lights.

Moreover, the plurality of signal lights include n signal lights having respectively corresponding frequencies $f_1$ through $f_n$ arranged in order from $f_1$ to $f_n$ along a frequency spectrum, where frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a unit of spacing between frequencies. $m_1$ through $m_{n-1}$ are all different from each other. In addition, $m_1$ through $m_{n-1}$ and the sum of any consecutive (n-2) spacing coefficients $m_1$ through $m_{n-1}$ should all be different from each other. $m_1$ through $m_{n-1}$ can be selected to minimize the sum of $m_1$ through $m_{n-1}$, thereby reducing the required bandwidth.

When the number of channels, n, and the minimum value $\Delta f_{min}$ (spacing of $m_1$ in FIG. 3) or minimum slot count $ns_{min}$ (which equals the smallest value of $m_i$, and, in FIG. 3, either $m_1$ or $\Delta f_{min}/\Delta f_{S-F}$) of channel separation are given, the channel arrangement $m_1, m_2, \ldots, m_{n-1}$ that satisfies the above conditions can be determined by a conventional linear programming process. Linear programming is a known process for determining values of variables that minimize (or maximize) a given linear function subject to constraints expressed as a combination of linear inequalities or equations with a number of variables. Here, $\Delta f_{S-F}$ and $\Delta f_{min}$ (or $ns_{min}$) are determined by system parameters such as, for example, the transmission characteristics of the optical couplers, the signal spectrum spreading and the accuracy of wavelength setting.

Table 1, below, shows the number of optimum arrangements, along with the results of calculations of required bandwidth, obtained when the number, n, of channels (wavelengths) is set to eight (8) while the minimum value $ns_{min}$ of channel separation is varied from one (1) to six (6).

TABLE 1

Arrangement of eight (8) waves with $ns_{min}$ = 1 to 6

| $ns_{min}$ | Example of arrangement $(m_1 - m_7)$ | Number of arrangements | m1 + m2 + ..., m7 (slots) | Comparison of required bandwidth between unequal and equal spacings |
|---|---|---|---|---|
| 1 | 1, 3, 5, 6, 7, 10, 2 | 2 | 34 | ≈4.9times |
| 2 | 2, 4, 10, 3, 8, 7, 5 | 24 | 39 | ≈2.8 |
| 3 | 3, 6, 7, 4, 8, 10, 5 | 10 | 43 | ≈2.0 |
| 4 | 4, 7, 5, 8, 10, 9, 6 | 76 | 49 | ≈1.8 |
| 5 | 5, 7, 6, 9, 8, 11, 10 | 206 | 56 | 1.6 |
| 6 | 6, 7, 8, 9, 10, 12, 11 | 506 | 63 | 1.5 |

The following list shows the arrangements of spacing coefficients $\{m_1, m_2, \ldots, m_{n-1}\}$ for each value of $ns_{min}$ (N is numbered consecutively) for eight (8) waves or channels.

| | 8-wave, $ns_{min}$ = 1 |
|---|---|
| 1 | {1, 3, 5, 6, 7, 10, 2} |
| 2 | {2, 10, 7, 6, 5, 3, 1} |
| | 8-wave, $ns_{min}$ = 2 |
| 1 | {3, 2, 8, 4, 7, 9, 6} |
| 2 | {6, 9, 7, 4, 8, 2, 3} |
| 3 | {2, 4, 10, 3, 8, 7, 5} |
| 4 | {5, 7, 8, 3, 10, 4, 2} |
| 5 | {3, 6, 11, 5, 2, 8, 4} |
| 6 | {4, 8, 2, 5, 11, 6, 3} |
| 7 | {2, 6, 5, 4, 12, 7, 3} |
| 8 | {2, 6, 12, 3, 7, 4, 5} |
| 9 | {2, 6, 12, 5, 4, 7, 3} |
| 10 | {2, 7, 4, 6, 12, 3, 5} |

| | -continued | | | -continued |
|---|---|---|---|---|
| 11 | {2, 7, 12, 4, 6, 5, 3} | | 52 | {7, 4, 8, 5, 9, 6, 10} |
| 12 | {3, 5, 6, 4, 12, 7, 2} | | 53 | {7, 4, 8, 10, 6, 9, 5} |
| 13 | {3, 7, 4, 5, 12, 6, 2} | | 54 | {7, 4, 10, 6, 9, 8, 5} |
| 14 | {3, 7, 6, 2, 12, 5, 4} | | 55 | {7, 10, 8, 4, 9, 6, 5} |
| 15 | {3, 7, 12, 2, 6, 5, 4} | | 56 | {8, 4, 7, 6, 10, 5, 9} |
| 16 | {3, 7, 12, 4, 5, 6, 2} | | 57 | {8, 4, 7, 10, 6, 9, 5} |
| 17 | {4, 5, 6, 2, 12, 7, 3} | | 58 | {8, 5, 6, 9, 7, 10, 4} |
| 18 | {4, 5, 12, 2, 6, 7, 3} | | 59 | {8, 5, 7, 4, 10, 9, 6} |
| 19 | {5, 3, 12, 6, 4, 7, 2} | | 60 | {8, 5, 9, 6, 10, 7, 4} |
| 20 | {5, 4, 7, 3, 12, 6, 2} | | 61 | {8, 6, 5, 10, 7, 9, 4} |
| 21 | {2, 6, 5, 10, 4, 3, 9} | | 62 | {8, 7, 5, 6, 10, 9, 4} |
| 22 | {2, 6, 5, 10, 9, 3, 4} | | 63 | {8, 7, 10, 6, 9, 5, 4} |
| 23 | {4, 3, 9, 10, 5, 6, 2} | | 64 | {8, 9, 7, 6, 5, 10, 4} |
| 24 | {9, 3, 4, 10, 5, 6, 2} | | 65 | {9, 4, 7, 5, 10, 8, 6} |
| | 8-wave, $ns_{min} = 3$ | | 66 | {9, 5, 6, 10, 7, 8, 4} |
| | | | 67 | {9, 5, 10, 6, 7, 4, 8} |
| 1 | {3, 6, 7, 4, 8, 10, 5} | | 68 | {9, 5, 10, 8, 4, 7, 6} |
| 2 | {3, 6, 8, 10, 5, 7, 4} | | 69 | {9, 7, 10, 5, 6, 8, 4} |
| 3 | {3, 8, 7, 6, 10, 4, 5} | | 70 | {10, 4, 7, 5, 8, 9, 6} |
| 4 | {4, 7, 5, 10, 3, 6, 8} | | 71 | {10, 4, 9, 8, 7, 5, 6} |
| 5 | {4, 7, 5, 10, 8, 6, 3} | | 72 | {10, 5, 7, 4, 9, 8, 6} |
| 6 | {4, 10, 5, 7, 6, 3, 8} | | 73 | {10, 6, 9, 5, 8, 4, 7} |
| 7 | {5, 4, 10, 6, 7, 8, 3} | | 74 | {10, 7, 8, 4, 9, 5, 6} |
| 8 | {5, 10, 8, 4, 7, 6, 3} | | 75 | {10, 7, 9, 4, 8, 6, 5} |
| 9 | {8, 3, 6, 7, 5, 10, 4} | | 76 | {10, 8, 6, 9, 4, 7, 5} |
| 10 | {8, 6, 3, 10, 5, 7, 4} | | | 8-wave, $ns_{min} = 5$ |
| | 8-wave, $ns_{min} = 4$ | | | |
| | | | 1 | {5, 7, 6, 9, 8, 11, 10} |
| 1 | {4, 7, 5, 8, 10, 9, 6} | | 2 | {5, 7, 9, 6, 11, 8, 10} |
| 2 | {4, 7, 5, 10, 9, 8, 6} | | 3 | {5, 7, 9, 10, 8, 6, 11} |
| 3 | {4, 7, 10, 6, 9, 5, 8} | | 4 | {5, 7, 9, 11, 8, 6, 10} |
| 4 | {4, 7, 10, 8, 5, 9, 6} | | 5 | {5, 7, 10, 8, 6, 9, 11} |
| 5 | {4, 8, 6, 5, 10, 7, 9} | | 6 | {5, 7, 10, 8, 11, 9, 6} |
| 6 | {4, 8, 6, 7, 9, 10, 5} | | 7 | {5, 7, 10, 11, 8, 6, 9} |
| 7 | {4, 8, 7, 10, 6, 5, 9} | | 8 | {5, 7, 10, 11, 9, 6, 8} |
| 8 | {4, 8, 10, 7, 9, 5, 6} | | 9 | {5, 7, 11, 9, 10, 6, 8} |
| 9 | {4, 9, 5, 6, 10, 7, 8} | | 10 | {5, 8, 6, 10, 7, 11, 9} |
| 10 | {4, 9, 6, 8, 10, 7, 5} | | 11 | {5, 8, 7, 9, 10, 11, 6} |
| 11 | {4, 9, 7, 5, 10, 8, 6} | | 12 | {5, 8, 7, 11, 6, 10, 9} |
| 12 | {4, 9, 7, 10, 5, 6, 8} | | 13 | {5, 8, 10, 11, 6, 9, 7} |
| 13 | {4, 9, 7, 10, 8, 6, 5} | | 14 | {5, 8, 11, 7, 10, 6, 9} |
| 14 | {4, 9, 10, 6, 5, 7, 8} | | 15 | {5, 8, 11, 7, 10, 6, 9} |
| 15 | {4, 9, 10, 6, 8, 7, 5} | | 16 | {5, 8, 11, 10, 7, 9, 6} |
| 16 | {4, 10, 5, 6, 7, 9, 8} | | 17 | {5, 9, 6, 7, 10, 8, 11} |
| 17 | {4, 10, 7, 9, 6, 5, 8} | | 18 | {5, 9, 6, 7, 10, 11, 8} |
| 18 | {4, 10, 9, 8, 7, 5, 6} | | 19 | {5, 9, 6, 10, 7, 11, 8} |
| 19 | {4, 10, 9, 8, 7, 6, 5} | | 20 | {5, 9, 7, 6, 11, 8, 10} |
| 20 | {5, 6, 7, 8, 9, 10, 4} | | 21 | {5, 9, 8, 7, 11, 10, 6} |
| 21 | {5, 6, 8, 4, 9, 7, 10} | | 22 | {5, 9, 8, 11, 7, 6, 10} |
| 22 | {5, 6, 8, 10, 7, 9, 4} | | 23 | {5, 9, 8, 11, 10, 6, 7} |
| 23 | {5, 6, 9, 4, 8, 10, 7} | | 24 | {5, 9, 11, 8, 7, 6, 10} |
| 24 | {5, 7, 4, 9, 6, 8, 10} | | 25 | {5, 9, 11, 8, 10, 6, 7} |
| 25 | {5, 7, 4, 9, 10, 8, 6} | | 26 | {5, 10, 6, 8, 9, 11, 7} |
| 26 | {5, 7, 4, 10, 8, 9, 6} | | 27 | {5, 10, 7, 9, 11, 8, 6} |
| 27 | {5, 7, 8, 6, 10, 9, 4} | | 28 | {5, 10, 8, 6, 7, 9, 11} |
| 28 | {5, 7, 10, 8, 6, 9, 4} | | 29 | {5, 10, 8, 6, 11, 9, 7} |
| 29 | {5, 8, 9, 6, 10, 4, 7} | | 30 | {5, 10, 8, 6, 11, 9, 7} |
| 30 | {5, 9, 4, 8, 7, 10, 6} | | 31 | {5, 10, 11, 7, 9, 8, 6} |
| 31 | {5, 9, 6, 10, 7, 4, 8} | | 32 | {5, 10, 11, 7, 9, 8, 6} |
| 32 | {5, 9, 6, 10, 8, 4, 7} | | 33 | {5, 10, 11, 8, 9, 7, 6} |
| 33 | {5, 10, 7, 9, 4, 8, 6} | | 34 | {5, 11, 6, 7, 8, 10, 9} |
| 34 | {5, 10, 9, 7, 6, 8, 4} | | 35 | {5, 11, 8, 10, 7, 6, 9} |
| 35 | {6, 5, 7, 8, 9, 4, 10} | | 36 | {5, 11, 9, 10, 8, 6, 7} |
| 36 | {6, 5, 7, 8, 9, 10, 4} | | 37 | {5, 11, 9, 10, 8, 6, 7} |
| 37 | {6, 5, 9, 4, 8, 7, 10} | | 38 | {5, 11, 10, 8, 9, 6, 7} |
| 38 | {6, 5, 9, 7, 10, 8, 4} | | 39 | {6, 7, 5, 11, 10, 9, 8} |
| 39 | {6, 7, 4, 8, 10, 5, 9} | | 40 | {6, 7, 9, 5, 10, 8, 11} |
| 40 | {6, 8, 4, 9, 7, 10, 5} | | 41 | {6, 7, 9, 8, 11, 10, 5} |
| 41 | {6, 8, 9, 4, 7, 5, 10} | | 42 | {6, 7, 9, 11, 8, 10, 5} |
| 42 | {6, 8, 9, 10, 5, 7, 4} | | 43 | {6, 8, 6, 10, 7, 9, 11} |
| 43 | {6, 8, 10, 5, 7, 4, 9} | | 44 | {6, 8, 5, 10, 7, 11, 9} |
| 44 | {6, 8, 10, 5, 7, 9, 4} | | 45 | {6, 8, 5, 10, 11, 7, 9} |
| 45 | {6, 8, 10, 9, 4, 7, 5} | | 46 | {6, 8, 5, 10, 11, 9, 7} |
| 46 | {6, 9, 5, 8, 10, 7, 4} | | 47 | {6, 8, 9, 7, 11, 10, 5} |
| 47 | {6, 9, 8, 5, 7, 4, 10} | | 48 | {6, 8, 9, 7, 11, 10, 5} |
| 48 | {6, 9, 8, 10, 4, 7, 5} | | 49 | {6, 8, 10, 5, 7, 9, 11} |
| 49 | {6, 9, 10, 4, 7, 5, 8} | | 50 | {6, 8, 10, 9, 11, 5, 7} |
| 50 | {6, 9, 10, 8, 5, 7, 4} | | 51 | {6, 8, 11, 9, 7, 5, 10} |
| 51 | {6, 10, 7, 8, 4, 9, 5} | | 52 | {6, 8, 11, 9, 7, 10, 5} |

-continued

| | |
|---|---|
| 53 | {6, 9, 5, 7, 10, 8, 11} |
| 54 | {6, 9, 10, 7, 11, 5, 8} |
| 55 | {6, 9, 10, 7, 11, 5, 8} |
| 56 | {6, 9, 10, 11, 7, 5, 8} |
| 57 | {6, 9, 11, 8, 10, 7, 5} |
| 58 | {6, 10, 5, 8, 9, 11, 7} |
| 59 | {6, 10, 5, 9, 8, 11, 7} |
| 60 | {6, 10, 7, 11, 8, 5, 9} |
| 61 | {6, 10, 7, 11, 5, 9, 8} |
| 62 | {6, 10, 8, 11, 9, 5, 7} |
| 63 | {6, 10, 9, 5, 8, 7, 11} |
| 64 | {6, 10, 9, 8, 5, 7, 11} |
| 65 | {6, 10, 11, 7, 5, 8, 9} |
| 66 | {6, 10, 11, 7, 8, 5, 9} |
| 67 | {6, 10, 11, 7, 8, 9, 5} |
| 68 | {6, 11, 5, 7, 8, 10, 9} |
| 69 | {6, 11, 8, 10, 5, 7, 9} |
| 70 | {6, 11, 8, 10, 5, 9, 7} |
| 71 | {6, 11, 9, 7, 5, 10, 8} |
| 72 | {6, 11, 10, 9, 5, 8, 7} |
| 73 | {6, 11, 10, 9, 7, 8, 5} |
| 74 | {7, 5, 8, 9, 6, 10, 11} |
| 75 | {7, 5, 8, 10, 9, 6, 11} |
| 76 | {7, 5, 8, 10, 11, 6, 9} |
| 77 | {7, 5, 8, 11, 10, 6, 9} |
| 78 | {7, 5, 9, 6, 10, 6, 11} |
| 79 | {7, 5, 9, 6, 11, 8, 10} |
| 80 | {7, 5, 9, 11, 6, 10, 8} |
| 81 | {7, 5, 9, 11, 8, 10, 6} |
| 82 | {7, 5, 10, 9, 11, 6, 8} |
| 83 | {7, 5, 10, 9, 11, 6, 8} |
| 84 | {7, 5, 10, 11, 9, 8, 6} |
| 85 | {7, 5, 11, 6, 8, 10, 9} |
| 86 | {7, 5, 11, 6, 9, 10, 8} |
| 87 | {7, 5, 11, 9, 10, 8, 6} |
| 88 | {7, 6, 8, 9, 10, 5, 11} |
| 89 | {7, 6, 8, 9, 11, 5, 10} |
| 90 | {7, 6, 8, 10, 5, 11, 9} |
| 91 | {7, 6, 8, 10, 9, 11, 5} |
| 92 | {7, 6, 9, 5, 11, 8, 10} |
| 93 | {7, 6, 9, 5, 11, 10, 8} |
| 94 | {7, 6, 9, 8, 10, 11, 5} |
| 95 | {7, 6, 10, 8, 11, 9, 5} |
| 96 | {7, 6, 10, 11, 8, 9, 5} |
| 97 | {7, 8, 5, 9, 10, 6, 11} |
| 98 | {7, 8, 5, 9, 10, 11, 6} |
| 99 | {7, 9, 5, 10, 8, 11, 6} |
| 100 | {7, 9, 6, 11, 10, 8, 5} |
| 101 | {7, 9, 11, 6, 8, 5, 10} |
| 102 | {7, 9, 11, 6, 8, 10, 5} |
| 103 | {7, 9, 11, 10, 5, 8, 6} |
| 104 | {7, 10, 6, 9, 5, 8, 11} |
| 105 | {7, 10, 6, 9, 11, 8, 5} |
| 106 | {7, 10, 6, 9, 11, 8, 5} |
| 107 | {7, 11, 8, 9, 5, 10, 6} |
| 108 | {7, 11, 9, 8, 6, 10, 5} |
| 109 | {7, 11, 9, 8, 6, 10, 5} |
| 110 | {8, 5, 7, 11, 6, 10, 9} |
| 111 | {8, 5, 7, 11, 6, 10, 9} |
| 112 | {8, 5, 7, 11, 10, 6, 9} |
| 113 | {8, 5, 7, 11, 10, 9, 6} |
| 114 | {8, 5, 9, 11, 7, 10, 6} |
| 115 | {8, 5, 11, 7, 10, 9, 6} |
| 116 | {8, 6, 7, 5, 10, 9, 11} |
| 117 | {8, 6, 7, 5, 11, 9, 10} |
| 118 | {8, 6, 7, 10, 5, 11, 9} |
| 119 | {8, 6, 9, 11, 10, 7, 5} |
| 120 | {8, 6, 9, 11, 10, 7, 5} |
| 121 | {8, 6, 10, 5, 7, 11, 9} |
| 122 | {8, 6, 10, 9, 11, 7, 5} |
| 123 | {8, 6, 11, 9, 7, 5, 10} |
| 124 | {8, 6, 11, 9, 10, 5, 7} |
| 125 | {8, 7, 5, 9, 10, 6, 11} |
| 126 | {8, 9, 10, 11, 5, 7, 6} |
| 127 | {8, 10, 5, 7, 9, 11, 6} |
| 128 | {8, 10, 6, 11, 9, 5, 7} |
| 129 | {8, 10, 9, 6, 11, 5, 7} |
| 130 | {8, 10, 11, 5, 9, 6, 7} |
| 131 | {8, 11, 5, 9, 6, 7, 10} |
| 132 | {8, 11, 7, 5, 9, 6, 10} |
| 133 | {8, 11, 7, 10, 6, 9, 5} |
| 134 | {8, 11, 10, 7, 6, 9, 5} |
| 135 | {9, 5, 7, 8, 10, 6, 11} |
| 136 | {9, 5, 7, 8, 11, 6, 10} |
| 137 | {9, 5, 8, 7, 11, 6, 10} |
| 138 | {9, 5, 8, 7, 11, 10, 6} |
| 139 | {9, 5, 8, 11, 7, 10, 6} |
| 140 | {9, 6, 7, 10, 8, 11, 5} |
| 141 | {9, 6, 8, 11, 10, 7, 5} |
| 142 | {9, 6, 10, 7, 5, 8, 11} |
| 143 | {9, 6, 10, 7, 5, 8, 11} |
| 144 | {9, 6, 10, 11, 7, 5, 8} |
| 145 | {9, 6, 10, 11, 8, 5, 7} |
| 146 | {9, 6, 11, 10, 8, 5, 7} |
| 147 | {9, 7, 5, 10, 8, 6, 11} |
| 148 | {9, 7, 5, 10, 8, 11, 6} |
| 149 | {9, 7, 6, 11, 8, 10, 5} |
| 150 | {9, 7, 11, 6, 8, 5, 10} |
| 151 | {9, 7, 11, 10, 5, 8, 6} |
| 152 | {9, 8, 5, 7, 11, 10, 6} |
| 153 | {9, 10, 6, 11, 7, 5, 8} |
| 154 | {9, 10, 6, 11, 7, 8, 5} |
| 155 | {9, 10, 8, 6, 11, 5, 7} |
| 156 | {9, 10, 8, 7, 5, 11, 6} |
| 157 | {9, 10, 8, 7, 6, 11, 5} |
| 158 | {9, 11, 5, 10, 7, 6, 8} |
| 159 | {9, 11, 5, 10, 7, 6, 7} |
| 160 | {9, 11, 6, 8, 10, 5, 7} |
| 161 | {9, 11, 7, 5, 10, 6, 8} |
| 162 | {9, 11, 7, 10, 5, 8, 6} |
| 163 | {9, 11, 7, 10, 6, 8, 5} |
| 164 | {10, 5, 7, 9, 11, 6, 8} |
| 165 | {10, 5, 7, 9, 11, 8, 6} |
| 166 | {10, 5, 8, 6, 11, 7, 9} |
| 167 | {10, 5, 8, 6, 11, 7, 9} |
| 168 | {10, 5, 11, 9, 8, 6, 7} |
| 169 | {10, 6, 7, 8, 11, 9, 5} |
| 170 | {10, 6, 7, 11, 8, 9, 5} |
| 171 | {10, 6, 9, 5, 7, 11, 8} |
| 172 | {10, 6, 9, 5, 8, 11, 7} |
| 173 | {10, 6, 11, 7, 8, 5, 9} |
| 174 | {10, 6, 11, 8, 7, 5, 9} |
| 175 | {10, 7, 6, 9, 5, 11, 8} |
| 176 | {10, 8, 5, 7, 9, 6, 11} |
| 177 | {10, 8, 6, 11, 9, 7, 5} |
| 178 | {10, 8, 11, 5, 9, 6, 7} |
| 179 | {10, 8, 11, 6, 7, 9, 5} |
| 180 | {10, 8, 11, 6, 7, 9, 5} |
| 181 | {10, 8, 11, 6, 9, 7, 5} |
| 182 | {10, 9, 6, 11, 7, 5, 8} |
| 183 | {10, 9, 11, 5, 7, 6, 8} |
| 184 | {10, 11, 8, 9, 6, 7, 5} |
| 185 | {11, 5, 10, 9, 8, 6, 7} |
| 186 | {11, 6, 8, 10, 5, 7, 9} |
| 187 | {11, 6, 8, 10, 9, 7, 5} |
| 188 | {11, 6, 9, 7, 5, 8, 10} |
| 189 | {11, 6, 9, 10, 8, 5, 7} |
| 190 | {11, 6, 10, 8, 7, 5, 9} |
| 191 | {11, 6, 10, 9, 5, 7, 8} |
| 192 | {11, 6, 10, 9, 5, 8, 7} |
| 193 | {11, 7, 5, 8, 9, 10, 6} |
| 194 | {11, 7, 8, 5, 9, 10, 6} |
| 195 | {11, 8, 5, 7, 10, 6, 9} |
| 196 | {11, 8, 5, 9, 6, 10, 7} |
| 197 | {11, 8, 10, 5, 9, 7, 6} |
| 198 | {11, 8, 10, 6, 9, 5, 7} |
| 199 | {11, 8, 10, 7, 5, 9, 6} |
| 200 | {11, 8, 10, 7, 6, 9, 5} |
| 201 | {11, 9, 6, 8, 10, 7, 5} |
| 202 | {11, 9, 7, 5, 10, 8, 6} |
| 203 | {11, 9, 7, 6, 8, 10, 5} |
| 204 | {11, 9, 7, 10, 5, 8, 6} |
| 205 | {11, 9, 10, 5, 7, 6, 8} |
| 206 | {11, 10, 6, 9, 8, 5, 7} |

8-wave, $ns_{min} = 6$

| | |
|---|---|
| 1 | {6, 7, 8, 9, 10, 12, 11} |
| 2 | {6, 7, 8, 9, 11, 12, 10} |

-continued

| | |
|---|---|
| 3 | {6, 7, 8, 10, 9, 11, 12} |
| 4 | {6, 7, 8, 10, 12, 11, 9} |
| 5 | {6, 7, 9, 8, 10, 11, 12} |
| 6 | {6, 7, 9, 10, 8, 12, 11} |
| 7 | {6, 7, 9, 10, 8, 12, 11} |
| 8 | {6, 7, 9, 12, 11, 12, 8} |
| 9 | {6, 7, 9, 12, 11, 8, 10} |
| 10 | {6, 7, 10, 8, 11, 9, 12} |
| 11 | {6, 7, 10, 12, 9, 11, 8} |
| 12 | {6, 7, 11, 8, 9, 12, 10} |
| 13 | {6, 7, 11, 10, 9, 8, 12} |
| 14 | {6, 7, 11, 10, 12, 8, 9} |
| 15 | {6, 7, 11, 12, 8, 9, 10} |
| 16 | {6, 7, 11, 12, 10, 9, 8} |
| 17 | {6, 7, 12, 10, 8, 9, 11} |
| 18 | {6, 7, 12, 10, 11, 9, 8} |
| 19 | {6, 7, 12, 11, 9, 8, 10} |
| 20 | {6, 7, 12, 11, 10, 8, 9} |
| 21 | {6, 8, 7, 9, 10, 12, 11} |
| 22 | {6, 8, 7, 9, 11, 12, 10} |
| 23 | {6, 8, 7, 10, 9, 11, 12} |
| 24 | {6, 8, 7, 10, 12, 11, 9} |
| 25 | {6, 8, 7, 11, 9, 10, 12} |
| 26 | {6, 8, 7, 11, 12, 10, 9} |
| 27 | {6, 8, 9, 7, 11, 10, 12} |
| 28 | {6, 8, 9, 7, 10, 12, 11} |
| 29 | {6, 8, 9, 11, 7, 12, 10} |
| 30 | {6, 8, 9, 11, 12, 10, 7} |
| 31 | {6, 8, 10, 7, 9, 11, 12} |
| 32 | {6, 8, 10, 7, 9, 12, 11} |
| 33 | {6, 8, 10, 7, 12, 9, 11} |
| 34 | {6, 8, 10, 7, 12, 11, 9} |
| 35 | {6, 8, 10, 11, 9, 7, 12} |
| 36 | {6, 8, 10, 11, 12, 7, 9} |
| 37 | {6, 8, 10, 12, 7, 9, 11} |
| 38 | {6, 8, 10, 12, 11, 9, 7} |
| 39 | {6, 8, 11, 7, 9, 12, 10} |
| 40 | {6, 8, 11, 7, 10, 12, 9} |
| 41 | {6, 8, 11, 9, 7, 10, 12} |
| 42 | {6, 8, 11, 9, 12, 10, 7} |
| 43 | {6, 8, 11, 12, 9, 7, 10} |
| 44 | {6, 8, 11, 12, 10, 7, 9} |
| 45 | {6, 8, 12, 10, 11, 7, 9} |
| 46 | {6, 9, 7, 10, 8, 12, 11} |
| 47 | {6, 9, 7, 10, 8, 11, 12} |
| 48 | {6, 9, 7, 10, 11, 8, 12} |
| 49 | {6, 9, 7, 10, 11, 12, 8} |
| 50 | {6, 9, 7, 12, 8, 10, 11} |
| 51 | {6, 9, 7, 12, 11, 10, 8} |
| 52 | {6, 9, 8, 12, 7, 11, 10} |
| 53 | {6, 9, 8, 12, 10, 11, 7} |
| 54 | {6, 9, 10, 7, 11, 12, 8} |
| 55 | {6, 9, 11, 12, 7, 10, 8} |
| 56 | {6, 9, 12, 8, 11, 7, 10} |
| 57 | {6, 9, 12, 10, 7, 11, 8} |
| 58 | {6, 9, 12, 11, 8, 10, 7} |
| 59 | {6, 10, 7, 8, 11, 9, 12} |
| 60 | {6, 10, 7, 11, 8, 12, 9} |
| 61 | {6, 10, 8, 7, 12, 9, 11} |
| 62 | {6, 10, 8, 7, 12, 11, 9} |
| 63 | {6, 10, 8, 9, 11, 12, 7} |
| 64 | {6, 10, 9, 8, 7, 11, 12} |
| 65 | {6, 10, 9, 8, 12, 11, 7} |
| 66 | {6, 10, 9, 12, 8, 7, 11} |
| 67 | {6, 10, 9, 12, 11, 7, 8} |
| 68 | {6, 10, 12, 9, 8, 7, 11} |
| 69 | {6, 10, 12, 9, 11, 7, 8} |
| 70 | {6, 10, 12, 11, 7, 8, 9} |
| 71 | {6, 11, 7, 8, 12, 9, 10} |
| 72 | {6, 11, 7, 8, 12, 10, 9} |
| 73 | {6, 11, 7, 9, 10, 12, 8} |
| 74 | {6, 11, 8, 7, 9, 12, 10} |
| 75 | {6, 11, 8, 10, 12, 9, 7} |
| 76 | {6, 11, 9, 7, 8, 10, 12} |
| 77 | {6, 11, 9, 7, 10, 12, 8} |
| 78 | {6, 11, 9, 12, 10, 8, 7} |
| 79 | {6, 11, 9, 12, 10, 8, 7} |
| 80 | {6, 11, 12, 8, 7, 9, 10} |
| 81 | {6, 11, 12, 8, 10, 9, 7} |
| 82 | {6, 11, 12, 9, 7, 9, 10} |
| 83 | {6, 11, 12, 9, 10, 8, 7} |
| 84 | {6, 11, 12, 10, 8, 7, 9} |
| 85 | {6, 11, 12, 10, 9, 7, 8} |
| 86 | {6, 12, 7, 8, 9, 11, 10} |
| 87 | {6, 12, 9, 11, 8, 7, 10} |
| 88 | {6, 12, 10, 11, 8, 7, 9} |
| 89 | {6, 12, 10, 11, 9, 7, 8} |
| 90 | {6, 12, 11, 9, 10, 7, 8} |
| 91 | {6, 12, 11, 10, 9, 7, 8} |
| 92 | {6, 12, 11, 10, 9, 8, 7} |
| 93 | {7, 6, 8, 10, 9, 11, 12} |
| 94 | {7, 6, 8, 10, 12, 11, 9} |
| 95 | {7, 6, 9, 10, 8, 12, 11} |
| 96 | {7, 6, 9, 10, 11, 12, 8} |
| 97 | {7, 6, 9, 12, 11, 8, 10} |
| 98 | {7, 6, 10, 8, 11, 9, 12} |
| 99 | {7, 6, 11, 8, 10, 12, 9} |
| 100 | {7, 6, 11, 9, 12, 10, 8} |
| 101 | {7, 6, 11, 12, 8, 10, 9} |
| 102 | {7, 6, 11, 12, 9, 10, 8} |
| 103 | {7, 6, 12, 8, 9, 10, 11} |
| 104 | {7, 6, 12, 11, 10, 9, 8} |
| 105 | {7, 8, 6, 10, 9, 11, 12} |
| 106 | {7, 8, 6, 10, 12, 11, 9} |
| 107 | {7, 8, 6, 11, 9, 10, 12} |
| 108 | {7, 8, 6, 11, 12, 10, 9} |
| 109 | {7, 8, 6, 12, 10, 9, 11} |
| 110 | {7, 8, 6, 12, 11, 9, 11} |
| 111 | {7, 8, 9, 10, 6, 12, 11} |
| 112 | {7, 8, 9, 10, 11, 12, 6} |
| 113 | {7, 8, 10, 6, 11, 9, 12} |
| 114 | {7, 8, 10, 6, 11, 12, 9} |
| 115 | {7, 8, 10, 9, 12, 11, 6} |
| 116 | {7, 8, 10, 12, 9, 11, 6} |
| 117 | {7, 8, 11, 6, 10, 12, 9} |
| 118 | {7, 9, 6, 11, 10, 8, 12} |
| 119 | {7, 9, 6, 11, 12, 8, 10} |
| 120 | {7, 9, 6, 12, 8, 11, 10} |
| 121 | {7, 9, 8, 6, 12, 10, 11} |
| 122 | {7, 9, '0, 8, 6, 11, 12} |
| 123 | {7, 9, 20, 8, 12, 11, 6} |
| 124 | {7, 9, 10, 12, 11, 6, 8} |
| 125 | {7, 9, 11, 6, 8, 10, 12} |
| 126 | {7, 9, 11, 10, 12, 6, 8} |
| 127 | {7, 9, 11, 12, 10, 8, 6} |
| 128 | {7, 9, 12, 10, 8, 6, 11} |
| 129 | {7, 9, 12, 10, 8, 11, 6} |
| 130 | {7, 9, 12, 11, 6, 8, 10} |
| 131 | {7, 10, 6, 8, 11, 9, 12} |
| 132 | {7, 10, 6, 9, 12, 8, 11} |
| 133 | {7, 10, 8, 11, 12, 9, 6} |
| 134 | {7, 10, 11, 8, 12, 6, 9} |
| 135 | {7, 10, 12, 9, 6, 8, 11} |
| 136 | {7, 10, 12, 9, 11, 8, 6} |
| 137 | {7, 11, 6, 8, 12, 9, 10} |
| 138 | {7, 11, 6, 8, 12, 9, 10} |
| 139 | {7, 11, 6, 9, 10, 12, 8} |
| 140 | {7, 11, 6, 10, 9, 12, 8} |
| 141 | {7, 11, 8, 6, 9, 12, 10} |
| 142 | {7, 11, 8, 6, 10, 12, 9} |
| 143 | {7, 11, 8, 12, 9, 6, 10} |
| 144 | {7, 11, 8, 12, 10, 6, 9} |
| 145 | {7, 11, 9, 12, 10, 6, 9} |
| 146 | {7, 11, 10, 6, 9, 8, 12} |
| 147 | {7, 11, 10, 9, 6, 8, 12} |
| 148 | {7, 11, 10, 12, 8, 6, 9} |
| 149 | {7, 11, 10, 12, 8, 9, 6} |
| 150 | {7, 11, 12, 8, 6, 10, 9} |
| 151 | {7, 11, 12, 8, 9, 10, 6} |
| 152 | {7, 11, 12, 9, 10, 6, 8} |
| 153 | {7, 12, 6, 8, 9, 11, 10} |
| 154 | {7, 12, 9, 11, 6, 8, 10} |
| 155 | {7, 12, 9, 11, 6, 10, 8} |
| 156 | {7, 12, 10, 8, 6, 9, 11} |
| 157 | {7, 12, 10, 8, 6, 11, 9} |
| 158 | {7, 12, 10, 11, 9, 6, 8} |
| 159 | {7, 12, 10, 11, 9, 8, 6} |
| 160 | {7, 12, 11, 9, 6, 10, 8} |

-continued

| | |
|---|---|
| 161 | {7, 12, 11, 9, 8, 10, 6} |
| 162 | {8, 6, 7, 11, 9, 10, 12} |
| 163 | {8, 6, 7, 11, 12, 10, 9} |
| 164 | {8, 6, 9, 11, 7, 10, 12} |
| 165 | {8, 6, 9, 11, 7, 12, 10} |
| 166 | {8, 6, 9, 11, 10, 7, 12} |
| 167 | {8, 6, 9, 11, 10, 12, 7} |
| 168 | {8, 6, 9, 12, 10, 7, 11} |
| 169 | {8, 6, 10, 7, 11, 9, 12} |
| 170 | {8, 6, 10, 7, 12, 9, 11} |
| 171 | {8, 6, 10, 9, 12, 11, 7} |
| 172 | {8, 6, 10, 12, 7, 11, 9} |
| 173 | {8, 6, 10, 12, 9, 11, 7} |
| 174 | {8, 6, 11, 7, 9, 10, 12} |
| 175 | {8, 6, 11, 7, 9, 12, 10} |
| 176 | {8, 6, 11, 9, 7, 12, 10} |
| 177 | {8, 6, 11, 10, 12, 7, 9} |
| 178 | {8, 6, 11, 12, 10, 9, 7} |
| 179 | {6, 6, 12, 7, 9, 11, 10} |
| 180 | {8, 6, 12, 7, 10, 11, 9} |
| 181 | {8, 6, 12, 10, 11, 9, 7} |
| 182 | {8, 7, 6, 11, 9, 10, 12} |
| 183 | {8, 7, 6, 11, 12, 10, 9} |
| 184 | {8, 7, 6, 12, 10, 9, 11} |
| 185 | {8, 7, 6, 12, 11, 9, 10} |
| 186 | {8, 7, 9, 10, 11, 6, 12} |
| 187 | {8, 7, 9, 10, 11, 12, 6} |
| 188 | {8, 7, 9, 10, 12, 6, 11} |
| 189 | {8, 7, 9, 10, 12, 11, 6} |
| 190 | {8, 7, 9, 11, 6, 12, 10} |
| 191 | {8, 7, 9, 11, 10, 12, 6} |
| 192 | {8, 7, 10, 6, 12, 9, 11} |
| 193 | {8, 7, 10, 9, 11, 12, 6} |
| 194 | {8, 7, 11, 6, 10, 9, 12} |
| 195 | {8, 7, 11, 6, 10, 12, 9} |
| 196 | {8, 7, 11, 9, 12, 10, 6} |
| 197 | {8, 7, 11, 12, 9, 10, 6} |
| 198 | {8, 9, 6, 10, 11, 7, 12} |
| 199 | {8, 9, 6, 10, 12, 7, 11} |
| 200 | {8, 9, 7, 6, 12, 11, 10} |
| 201 | {8, 9, 10, 11, 12, 6, 7} |
| 202 | {8, 9, 10, 12, 11, 7, 6} |
| 203 | {8, 9, 11, 10, 6, 7, 12} |
| 204 | {8, 9, 11, 10, 12, 7, 6} |
| 205 | {8, 9, 12, 10, 12, 7, 6} |
| 206 | {8, 10, 6, 7, 12, 9, 11} |
| 207 | {8, 10, 6, 9, 11, 12, 7} |
| 208 | {8, 10, 6, 11, 9, 12, 7} |
| 209 | {8, 10, 7, 12, 11, 9, 6} |
| 210 | {8, 10, 9, 7, 6, 11, 12} |
| 211 | {8, 10, 9, 12, 11, 6, 7} |
| 212 | {8, 10, 11, 6, 9, 7, 12} |
| 213 | {8, 10, 11, 9, 6, 7, 12} |
| 214 | {8, 10, 11, 12, 7, 6, 9} |
| 215 | {8, 10, 11, 12, 7, 9, 6} |
| 216 | {8, 10, 12, 7, 6, 11, 9} |
| 217 | {8, 10, 12, 7, 9, 11, 6} |
| 218 | {8, 10, 12, 9, 11, 6, 7} |
| 219 | {8, 11, 7, 6, 10, 12, 9} |
| 220 | {8, 11, 7, 10, 6, 9, 12} |
| 221 | {8, 11, 7, 10, 12, 9, 6} |
| 222 | {8, 11, 9, 12, 6, 7, 10} |
| 223 | {8, 11, 9, 12, 10, 7, 6} |
| 224 | {8, 11, 10, 7, 9, 6, 12} |
| 225 | {8, 11, 12, 6, 9, 7, 10} |
| 226 | {8, 12, 9, 6, 10, 7, 11} |
| 227 | {8, 12, 9, 10, 6, 7, 11} |
| 228 | {8, 12, 9, 10, 6, 11, 7} |
| 229 | {8, 12, 10, 9, 6, 11, 7} |
| 230 | {8, 12, 10, 9, 7, 11, 6} |
| 231 | {8, 12, 11, 6, 7, 11, 6} |
| 232 | {8, 12, 11, 7, 6, 9, 10} |
| 233 | {8, 12, 11, 7, 10, 9, 6} |
| 234 | {8, 12, 11, 10, 7, 9, 6} |
| 235 | {8, 12, 11, 10, 9, 6, 7} |
| 236 | {8, 12, 11, 10, 9, 7, 6} |
| 237 | {9, 6, 7, 10, 11, 8, 12} |
| 238 | {9, 6, 7, 12, 8, 10, 11} |
| 239 | {9, 6, 7, 12, 11, 10, 8} |
| 240 | {9, 6, 8, 11, 7, 10, 12} |
| 241 | {9, 6, 8, 12, 7, 10, 11} |
| 242 | {9, 6, 8, 12, 7, 11, 10} |
| 243 | {9, 6, 8, 12, 10, 7, 11} |
| 244 | {9, 6, 8, 12, 10, 11, 7} |
| 245 | {9, 6, 10, 7, 11, 8, 12} |
| 246 | {9, 6, 10, 12, 8, 11, 7} |
| 247 | {9, 6, 12, 8, 11, 10, 7} |
| 248 | {9, 7, 6, 11, 10, 8, 12} |
| 249 | {9, 7, 6, 11, 12, 8, 10} |
| 250 | {9, 7, 6, 12, 8, 11, 10} |
| 251 | {9, 7, 8, 6, 11, 12, 10} |
| 252 | {9, 7, 8, 10, 12, 11, 6} |
| 253 | {9, 7, 8, 11, 10, 12, 6} |
| 254 | {9, 7, 8, 11, 10, 12, 6} |
| 255 | {9, 7, 10, 12, 11, 8, 6} |
| 256 | {9, 7, 11, 6, 8, 12, 10} |
| 257 | {9, 7, 11, 6, 8, 12, 10} |
| 258 | {9, 7, 12, 10, 8, 6, 11} |
| 259 | {9, 7, 12, 10, 11, 6, 8} |
| 260 | {9, 7, 12, 11, 6, 8, 10} |
| 261 | {9, 7, 12, 11, 10, 8, 6} |
| 262 | {9, 8, 6, 10, 11, 7, 12} |
| 263 | {9, 8, 6, 10, 12, 7, 11} |
| 264 | {9, 8, 7, 11, 12, 10, 6} |
| 265 | {9, 8, 10, 11, 12, 7, 6} |
| 266 | {9, 8, 12, 10, 6, 7, 11} |
| 267 | {9, 8, 12, 10, 11, 7, 6} |
| 268 | {9, 10, 6, 8, 7, 11, 12} |
| 269 | {9, 10, 6, 8, 12, 11, 7} |
| 270 | {9, 10, 8, 7, 6, 11, 12} |
| 271 | {9, 10, 8, 12, 11, 6, 7} |
| 272 | {9, 10, 12, 8, 6, 7, 11} |
| 273 | {9, 10, 12, 8, 6, 11, 7} |
| 274 | {9, 10, 12, 8, 7, 6, 11} |
| 275 | {9, 10, 12, 8, 7, 11, 6} |
| 276 | {9, 10, 12, 11, 6, 7, 8} |
| 277 | {9, 10, 12, 11, 6, 8, 7} |
| 278 | {9, 10, 12, 11, 7, 6, 8} |
| 279 | {9, 10, 12, 11, 7, 8, 6} |
| 280 | {9, 11, 6, 7, 8, 10, 12} |
| 281 | {9, 11, 6, 7, 12, 10, 8} |
| 282 | {9, 11, 6, 8, 7, 12, 10} |
| 283 | {9, 11, 6, 8, 10, 12, 7} |
| 284 | {9, 11, 7, 8, 6, 10, 12} |
| 285 | {9, 11, 7, 12, 10, 6, 8} |
| 286 | {9, 11, 8, 6, 7, 10, 12} |
| 287 | {9, 11, 12, 6, 8, 7, 10} |
| 288 | {9, 11, 12, 6, 8, 7, 10} |
| 289 | {9, 11, 12, 7, 6, 8, 10} |
| 290 | {9, 11, 12, 7, 8, 6, 10} |
| 291 | {9, 11, 12, 7, 8, 10, 6} |
| 292 | {9, 11, 12, 7, 10, 8, 6} |
| 293 | {9, 11, 12, 10, 6, 8, 7} |
| 294 | {9, 11, 12, 10, 7, 8, 6} |
| 295 | {9, 11, 12, 10, 8, 6, 7} |
| 296 | {9, 11, 12, 10, 8, 7, 6} |
| 297 | {9, 12, 6, 10, 7, 8, 11} |
| 298 | {9, 12, 8, 6, 10, 7, 11} |
| 299 | {9, 12, 8, 11, 7, 6, 10} |
| 300 | {9, 12, 8, 11, 7, 10, 6} |
| 301 | {9, 12, 10, 6, 7, 11, 8} |
| 302 | {9, 12, 10, 6, 8, 11, 7} |
| 303 | {9, 12, 10, 6, 11, 7, 8} |
| 304 | {9, 12, 10, 6, 11, 8, 7} |
| 305 | {9, 12, 10, 7, 11, 8, 6} |
| 306 | {9, 12, 10, 8, 11, 8, 6} |
| 307 | {9, 12, 10, 8, 11, 6, 7} |
| 308 | {10, 6, 7, 11, 8, 9, 12} |
| 309 | {10, 6, 7, 11, 8, 12, 9} |
| 310 | {10, 6, 8, 7, 12, 11, 9} |
| 311 | {10, 6, 8, 9, 11, 7, 12} |
| 312 | {10, 6, 8, 9, 12, 7, 11} |
| 313 | {10, 6, 9, 8, 12, 7, 11} |
| 314 | {10, 6, 9, 12, 8, 11, 7} |
| 315 | {10, 7, 6, 9, 12, 8, 11} |
| 316 | {10, 7, 6, 12, 9, 11, 9} |
| 317 | {10, 7, 8, 6, 12, 11, 9} |
| 318 | {10, 7, 8, 11, 9, 12, 6} |

-continued

| | |
|---|---|
| 319 | {10, 7, 9, 6, 12, 11, 8} |
| 320 | {10, 7, 9, 12, 11, 8, 6} |
| 321 | {10, 7, 11, 8, 6, 9, 12} |
| 322 | {10, 7, 11, 8, 12, 9, 6} |
| 323 | {10, 8, 6, 7, 9, 11, 12} |
| 324 | {10, 8, 6, 7, 12, 11, 9} |
| 325 | {10, 8, 6, 11, 9, 7, 12} |
| 326 | {10, 8, 6, 11, 9, 12, 7} |
| 327 | {10, 8, 6, 11, 12, 7, 9} |
| 328 | {10, 8, 6, 11, 12, 9, 7} |
| 329 | {10, 8, 7, 9, 12, 11, 6} |
| 330 | {10, 8, 7, 12, 9, 11, 6} |
| 331 | {10, 8, 9, 11, 12, 7, 6} |
| 332 | {10, 8, 11, 6, 7, 9, 12} |
| 333 | {10, 8, 11, 12, 9, 6, 7} |
| 334 | {10, 8, 11, 12, 9, 7, 6} |
| 335 | {10, 8, 12, 7, 9, 6, 11} |
| 336 | {10, 8, 12, 9, 7, 6, 11} |
| 337 | {10, 8, 12, 11, 6, 9, 7} |
| 338 | {10, 8, 12, 11, 6, 9, 7} |
| 339 | {10, 9, 6, 7, 11, 12, 8} |
| 340 | {10, 9, 7, 6, 11, 12, 8} |
| 341 | {10, 9, 7, 8, 6, 11, 12} |
| 342 | {10, 9, 7, 8, 12, 11, 6} |
| 343 | {10, 9, 8, 7, 6, 12, 11} |
| 344 | {10, 9, 8, 12, 11, 7, 6} |
| 345 | {10, 9, 11, 12, 6, 7, 8} |
| 346 | {10, 9, 11, 12, 6, 8, 7} |
| 347 | {10, 9, 12, 8, 6, 11, 7} |
| 348 | {10, 9, 12, 8, 7, 11, 6} |
| 349 | {10, 11, 7, 6, 9, 8, 12} |
| 350 | {10, 11, 7, 9, 6, 8, 12} |
| 351 | {10, 11, 7, 9, 6, 8, 12} |
| 352 | {10, 11, 7, 12, 8, 9, 6} |
| 353 | {10, 11, 8, 9, 7, 6, 12} |
| 354 | {10, 11, 8, 12, 6, 7, 9} |
| 355 | {10, 11, 8, 12, 6, 9, 7} |
| 356 | {10, 11, 9, 6, 12, 6, 8} |
| 357 | {10, 11, 9, 8, 6, 12, 7} |
| 358 | {10, 11, 9, 8, 7, 12, 6} |
| 359 | {10, 11, 12, 6, 7, 9, 8} |
| 360 | {10, 11, 12, 8, 9, 7, 6} |
| 361 | {10, 12, 6, 8, 7, 9, 11} |
| 362 | {10, 12, 6, 11, 8, 7, 9} |
| 363 | {10, 12, 6, 11, 9, 7, 8} |
| 364 | {10, 12, 7, 6, 8, 9, 11} |
| 365 | {10, 12, 7, 8, 6, 11, 9} |
| 366 | {10, 12, 7, 9, 11, 6, 8} |
| 367 | {10, 12, 7, 9, 11, 6, 8} |
| 368 | {10, 12, 7, 11, 9, 8, 6} |
| 369 | {10, 12, 8, 6, 11, 7, 9} |
| 370 | {10, 12, 9, 6, 8, 11, 7} |
| 371 | {10, 12, 9, 7, 8, 11, 6} |
| 372 | {10, 12, 9, 7, 11, 6, 8} |
| 373 | {10, 12, 9, 7, 11, 8, 6} |
| 374 | {10, 12, 9, 8, 11, 7, 6} |
| 375 | {10, 12, 11, 6, 8, 7, 9} |
| 376 | {10, 12, 11, 9, 7, 8, 6} |
| 377 | {10, 12, 11, 9, 8, 7, 6} |
| 378 | {11, 6, 7, 8, 12, 10, 9} |
| 379 | {11, 6, 7, 9, 10, 8, 12} |
| 380 | {11, 6, 7, 9, 12, 8, 10} |
| 381 | {11, 6, 8, 7, 9, 10, 12} |
| 382 | {11, 6, 8, 10, 12, 7, 9} |
| 383 | {11, 6, 8, 10, 12, 9, 7} |
| 384 | {11, 6, 9, 7, 12, 8, 10} |
| 385 | {11, 6, 12, 10, 9, 7, 8} |
| 386 | {11, 7, 6, 8, 9, 10, 12} |
| 387 | {11, 7, 6, 8, 12, 10, 9} |
| 388 | {11, 7, 6, 10, 9, 8, 12} |
| 389 | {11, 7, 6, 10, 9, 12, 8} |
| 390 | {11, 7, 6, 10, 12, 8, 9} |
| 391 | {11, 7, 6, 10, 12, 9, 8} |
| 392 | {11, 7, 8, 9, 12, 10, 6} |
| 393 | {11, 7, 8, 12, 9, 10, 6} |
| 394 | {11, 7, 10, 6, 9, 12, 9} |
| 395 | {11, 7, 10, 6, 9, 12, 8} |
| 396 | {11, 7, 10, 12, 8, 6, 9} |
| 397 | {11, 7, 10, 12, 9, 6, 8} |
| 398 | {11, 7, 12, 8, 9, 6, 10} |
| 399 | {11, 7, 12, 10, 6, 8, 9} |
| 400 | {11, 7, 12, 10, 6, 8, 9} |
| 401 | {11, 7, 12, 10, 6, 9, 8} |
| 402 | {11, 8, 6, 9, 12, 10, 7} |
| 403 | {11, 8, 7, 10, 6, 12, 9} |
| 404 | {11, 8, 10, 7, 6, 9, 12} |
| 405 | {11, 8, 12, 9, 6, 7, 10} |
| 406 | {11, 8, 12, 9, 6, 10, 7} |
| 407 | {11, 9, 6, 8, 10, 7, 12} |
| 408 | {11, 9, 6, 8, 10, 12, 7} |
| 409 | {11, 9, 7, 8, 6, 12, 10} |
| 410 | {11, 9, 7, 12, 10, 8, 6} |
| 411 | {11, 9, 8, 6, 7, 12, 10} |
| 412 | {11, 9, 8, 10, 6, 7, 12} |
| 413 | {11, 9, 8, 10, 12, 7, 6} |
| 414 | {11, 9, 10, 12, 6, 7, 8} |
| 415 | {11, 9, 10, 12, 6, 8, 7} |
| 416 | {11, 9, 12, 6, 10, 7, 8} |
| 417 | {11, 9, 12, 7, 6, 10, 8} |
| 418 | {11, 9, 12, 7, 8, 10, 6} |
| 419 | {11, 9, 12, 7, 10, 6, 8} |
| 420 | {11, 9, 12, 7, 10, 8, 6} |
| 421 | {11, 10, 7, 12, 8, 6, 9} |
| 422 | {11, 10, 8, 6, 9, 7, 12} |
| 423 | {11, 10, 8, 9, 6, 7, 12} |
| 424 | {11, 10, 8, 12, 7, 6, 9} |
| 425 | {11, 10, 8, 12, 7, 9, 6} |
| 426 | {11, 10, 9, 8, 12, 6, 7} |
| 427 | {11, 10, 12, 6, 8, 9, 7} |
| 428 | {11, 10, 12, 7, 9, 8, 6} |
| 429 | {11, 12, 6, 7, 8, 9, 10} |
| 430 | {11, 12, 6, 10, 9, 8, 7} |
| 431 | {11, 12, 8, 10, 7, 9, 6} |
| 432 | {11, 12, 8, 10, 9, 6, 7} |
| 433 | {11, 12, 8, 10, 9, 7, 6} |
| 434 | {11, 12, 9, 7, 10, 8, 6} |
| 435 | {11, 12, 10, 9, 7, 8, 6} |
| 436 | {11, 12, 10, 9, 8, 7, 6} |
| 437 | {12, 6, 7, 9, 8, 11, 10} |
| 438 | {12, 6, 9, 7, 10, 11, 8} |
| 439 | {12, 6, 11, 10, 9, 7, 8} |
| 440 | {12, 7, 6, 9, 8, 10, 11} |
| 441 | {12, 7, 6, 9, 11, 10, 8} |
| 442 | {12, 7, 6, 10, 8, 9, 11} |
| 443 | {12, 7, 6, 10, 11, 9, 8} |
| 444 | {12, 7, 9, 6, 8, 10, 11} |
| 445 | {12, 7, 9, 6, 11, 10, 8} |
| 446 | {12, 7, 9, 11, 6, 8, 10} |
| 447 | {12, 7, 9, 11, 10, 8, 6} |
| 448 | {12, 7, 10, 8, 6, 9, 11} |
| 449 | {12, 7, 10, 11, 9, 6, 8} |
| 450 | {12, 7, 11, 9, 8, 6, 10} |
| 451 | {12, 7, 11, 10, 6, 8, 9} |
| 452 | {12, 7, 11, 10, 6, 9, 8} |
| 453 | {12, 8, 6, 9, 7, 11, 10} |
| 454 | {12, 8, 6, 9, 10, 11, 7} |
| 455 | {12, 8, 9, 6, 7, 11, 10} |
| 456 | {12, 8, 9, 6, 10, 11, 7} |
| 457 | {12, 8, 9, 10, 6, 7, 11} |
| 458 | {12, 8, 9, 10, 11, 7, 6} |
| 459 | {12, 8, 10, 11, 6, 7, 9} |
| 460 | {12, 8, 10, 11, 6, 7, 9} |
| 461 | {12, 8, 10, 11, 6, 9, 7} |
| 462 | {12, 8, 11, 7, 10, 6, 9} |
| 463 | {12, 8, 11, 10, 7, 6, 9} |
| 464 | {12, 8, 11, 10, 7, 9, 6} |
| 465 | {12, 9, 6, 7, 10, 8, 11} |
| 466 | {12, 9, 6, 8, 11, 7, 10} |
| 467 | {12, 9, 6, 10, 7, 11, 8} |
| 468 | {12, 9, 7, 6, 11, 8, 10} |
| 469 | {12, 9, 8, 11, 7, 6, 10} |
| 470 | {12, 9, 10, 6, 11, 7, 8} |
| 471 | {12, 9, 11, 6, 10, 8, 7} |
| 472 | {12, 9, 11, 7, 10, 6, 8} |
| 473 | {12, 9, 11, 8, 6, 10, 7} |
| 474 | {12, 9, 11, 8, 7, 10, 6} |
| 475 | {12, 9, 11, 8, 10, 6, 7} |
| 476 | {12, 9, 11, 8, 10, 7, 6} |

| | -continued |
|---|---|
| 477 | {12, 10, 6, 8, 7, 11, 9} |
| 478 | {12, 10, 7, 6, 8, 11, 9} |
| 479 | {12, 10, 7, 9, 11, 8, 6} |
| 480 | {12, 10, 7, 11, 8, 6, 9} |
| 481 | {12, 10, 7, 11, 9, 6, 8} |
| 482 | {12, 10, 8, 6, 11, 9, 7} |
| 483 | {12, 10, 8, 7, 6, 11, 9} |
| 484 | {12, 10, 8, 7, 9, 11, 6} |
| 485 | {12, 10, 9, 7, 11, 6, 8} |
| 486 | {12, 10, 9, 7, 11, 6, 8} |
| 487 | {12, 10, 9, 8, 6, 7, 11} |
| 488 | {12, 10, 9, 11, 6, 7, 8} |
| 489 | {12, 10, 9, 11, 7, 6, 8} |
| 490 | {12, 10, 9, 11, 7, 6, 8} |
| 491 | {12, 10, 9, 11, 7, 8, 6} |
| 492 | {12, 10, 11, 7, 9, 8, 6} |
| 493 | {12, 11, 6, 7, 8, 10, 9} |
| 494 | {12, 11, 6, 7, 9, 10, 8} |
| 495 | {12, 11, 6, 8, 7, 9, 10} |
| 496 | {12, 11, 7, 8, 6, 10, 9} |
| 497 | {12, 11, 7, 8, 6, 10, 9} |
| 498 | {12, 11, 7, 8, 9, 10, 6} |
| 499 | {12, 11, 8, 10, 7, 9, 6} |
| 500 | {12, 11, 9, 7, 6, 8, 10} |
| 501 | {12, 11, 9, 7, 10, 8, 6} |
| 502 | {12, 11, 9, 10, 6, 8, 7} |
| 503 | {12, 11, 9, 10, 7, 8, 6} |
| 504 | {12, 11, 9, 10, 8, 6, 7} |
| 505 | {12, 11, 9, 10, 8, 7, 6} |
| 506 | {12, 11, 10, 8, 9, 7, 6} |

The above arrangements are also applicable in cases where there are less than eight (8) wavelength, but there is a possibility of increasing the number of wavelengths up to eight (8). Also, the above arrangements are applicable in cases where there are more than eight (8) wavelengths, but wavelengths other than eight (8) are used for other purposes, such as to monitor a signal light. When wavelengths are used for such other purposes, the wavelengths typically are largely displaced or correspond to signal lights having small power and which are less sensitive to the effects of FWM.

Moreover, the above embodiments of the present invention are not intended to be limited to the use of eight waves or channels (that is, where n=8). Instead, calculations can be performed to determine arrangements where the number of channels is different from eight (8). Moreover, when the value of n is small, optimum solutions can be easily obtained without requiring the use of linear programming. For example, when n equals three (3) and $ns_{min}$ equals one (1), {m1, m2}={1, 2}, {2, 1} can be instantly determined.

Figure 4:
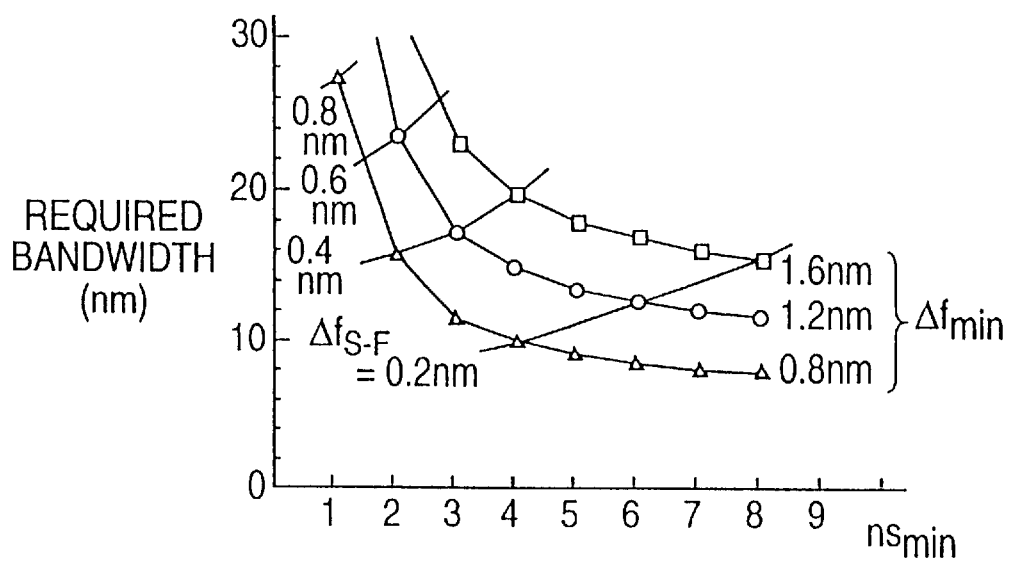
FIG. 4 is a graph illustrating the relationship between minimum slot count $ns_{min}$ and required bandwidth of a wavelength division multiplexing optical communication system, according to an embodiment of the present invention.

FIG. 4 is a graph illustrating the relationship between minimum slot count $ns_{min}$ and required bandwidth for eight (8) channels, according to an embodiment of the present invention. More specifically, FIG. 4 shows the relationships between $ns_{min}$, $\Delta f_{S-F}$, and the required signal bandwidth when the minimum channel separation $\Delta f_{min}$, is set to 0.8, 1.2, and 1.6 nm, respectively.

In an equally spaced arrangement, each channel is separated by the same distance, $\Delta f_{S-F}$, Therefore, in an equally spaced arrangement for eight (8) waves, the required bandwidth equals $\Delta f_{S-F} \times 7$ (see $\Delta f_{S-F}$ in FIG. 3). As can be seen from FIG. 4, as the minimum slot count nsmin increases, the required bandwidth approaches the required bandwidth ($\Delta f_{S-F} \times 7$) for the equally spaced arrangement. However, since the minimum separation $\Delta f_{S-F}$ decreases as a result of the increasing minimum slot count $ns_{min}$, the effects of FWM light increase.

An unequally spaced arrangement, as in the embodiments of the present invention, generally requires a higher degree of signal wavelength control accuracy than an equally spaced arrangement. More specifically, when the signal wavelength control accuracy is $\Delta f_{sift}$, it is shown from Equation (1), above, that the FWM light may shift in wavelength by 3 $\Delta f_{sift}$, in the worst case. When the wavelength variation of the signal light itself is considered, the wavelength spacing between the signal light and FWM light may vary by 4 $\Delta f_{sift}$ in relative terms. Similarly, the spectrum spreading of FWM, $\Delta \gamma_{FWM}$, may become three times as wide as the spectrum spreading of the signal light, $\Delta \gamma_S$, in the worst case.

Figure 5:
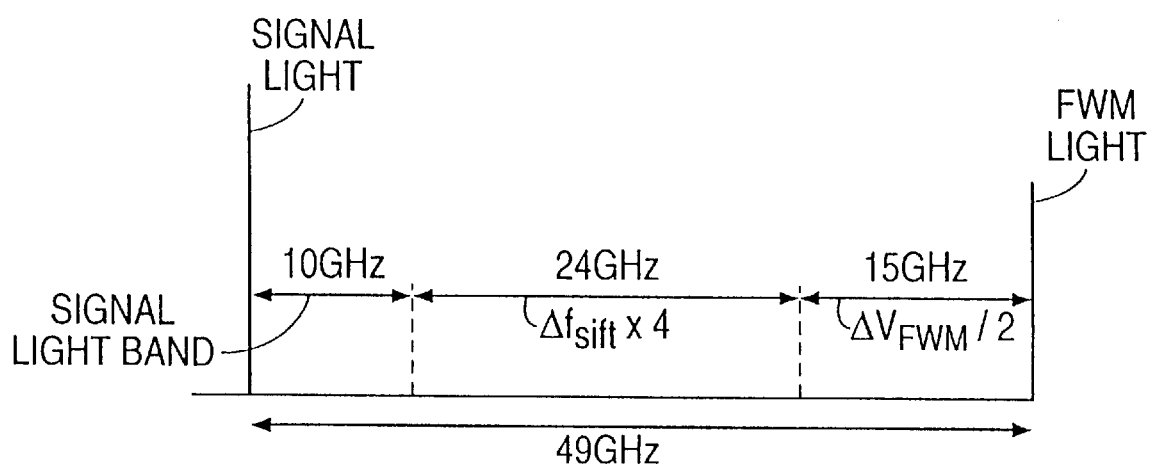
FIG. 5 is a diagram illustrating the determination of slot spacing $\Delta f_{S-F}$ of a wavelength division multiplexing optical communication system, according to an embodiment of the present invention.

As an example, FIG. 5 is a diagram illustrating the determination of slot spacing $\Delta f_{S-F}$ of a wavelength division multiplexing optical communication system, according to an embodiment of the present invention. Referring now to FIG. 5, for example, when the received signal bandwidth is 10 GHz, $\Delta f_{sift}$ is 6 GHz, and $\Delta \gamma_S$ is 10 GHz ($\Delta \gamma_{FWM}$=30 GHz). In this case, for example, a minimum of about 50 GHz is generally required for $\Delta f_{S-F}$, as shown in FIG. 5. If $\Delta f_{min}$ is made greater than 100 GHz (0.8 nm) and the gain region of post amplifiers 24 (see FIG. 1), optical amplifiers 26 (see FIG. 1), and optical preamplifier 28 (see FIG. 1) is smaller than about 20 nm by considering the cutoff characteristics of wavelength division multiplexer 22 and optical coupler 30, $ns_{min}$ of around 2 to 4 (thereby providing a minimum separation or minimum slot count of $2 \cdot \Delta f_{S-F}$ to $4 \cdot \Delta f_{S-F}$) and $\Delta f_{S-F}$ of around 0.4 nm (=about 50 GHz) are considered practical from FIG. 4.

Figure 6:
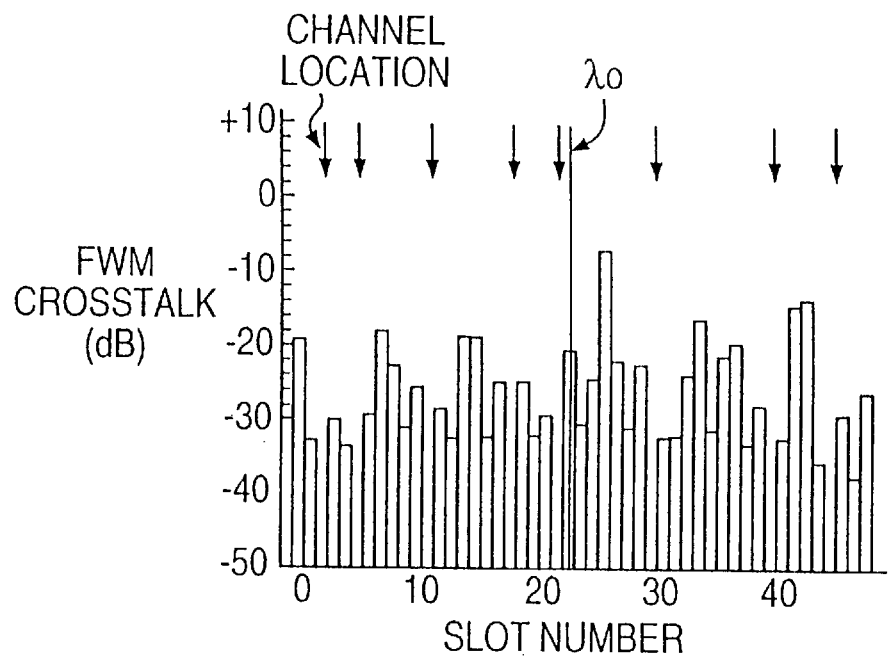
FIG. 6 is a graph illustrating calculation results of FWM light in an unequally spaced arrangement of signal lights of a wavelength division multiplexing optical communication system, according to an embodiment of the present invention.

FIG. 6 is a graph illustrating calculation results of FWM light in an unequally spaced arrangement for eight channels, according to an embodiment of the present invention, where $ns_{min}$=3, $m_1$ to $m_7$={3, 6, 7, 4, 3, 10, 5}, $\Delta f_{S-F}$=0.4 nm, and $\Delta f_{min}$=1.2 nm.

Figure 7:
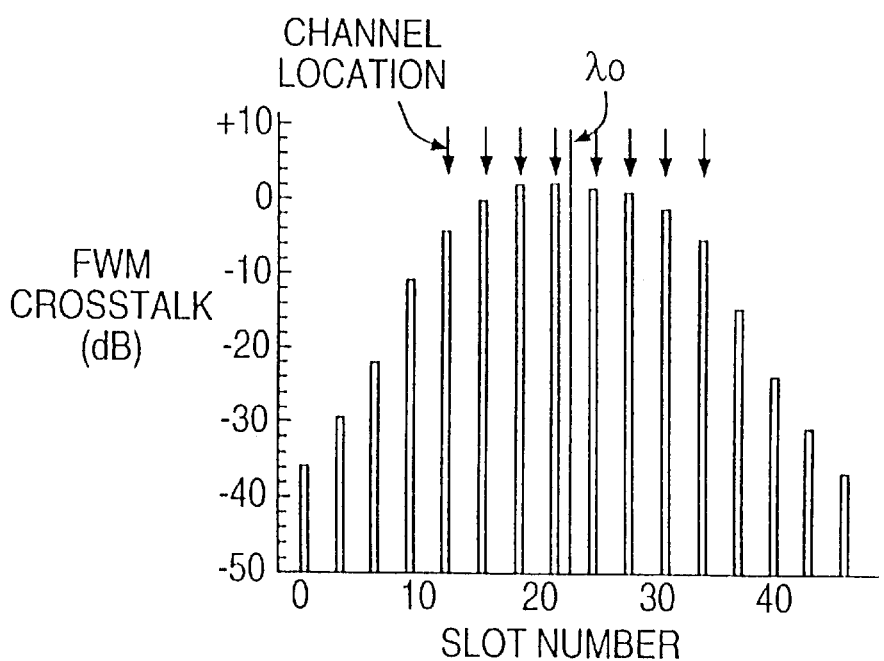
FIG. 7 is a graph illustrating calculation results of FWM light in an equally spaced arrangement of signal lights of a wavelength division multiplexed optical communication system.

In contrast, FIG. 7 is a graph illustrating calculation results of FWM light in an equally spaced arrangement for eight channels.

In FIGS. 6 and 7, the vertical axis represents the ratio of FWM light power to signal light power, the horizontal axis represents the slot number, and signals are located at positions indicated by downward pointing arrows. Calculations were performed by assuming that the length of the dispersion shifted fiber (DSF) (see, for example, DSF 16 in FIG. 1) was 75 km, the input light power Pin was 10 dBm/ch (CW), there was no signal light attenuation caused by the occurrence of FWM light, the polarization direction was the same for all channels, and the zero dispersion wavelength $\lambda_o$ was located approximately at the center of the signal band.

Referring now to FIG. 7, it can be seen that FWM with large energy occurred at signal light wavelengths in the equally spaced arrangement. In contrast, referring now to FIG. 6, it can be seen that the undesirable effect of FWM was virtually eliminated in the unequally spaced arrangement. Therefore, arranging the channels in an unequally spaced arrangement, as in the above embodiments of the present invention, suppresses or eliminates the effect of FWM. The result is the same for any arrangement in the above list of arrangements.

As previously described, when the variation of $\Delta f_{S-F}$ is large, or when optical filters with broad transmission characteristics are used in the optical communication system, there is a possibility that FWM light may fall within the received signal band. Accordingly, it is desirable that FWM light occurring at the nearest position spaced away by $\Delta f_{S-F}$ from the signal light be made as small as possible.

For each of ten (10) combinations when $ns_{min}$=3 (see the combinations in the above list of arrangements for $ns_{min}$=3), the magnitude of the largest adjacent FWM light at each slot point was calculated while moving the zero dispersion wavelength $\lambda_o$ of the dispersion shifted fiber by one point at a time along the slots. The calculation conditions are the same as those used for FIGS. 6 and 7. The results are shown in FIGS. 8 to 17.

More specifically, FIGS. 8–17 are graphs illustrating the relationship between the zero dispersion wavelength $\lambda_o$ and adjacent FWM light power for the first arrangement through a tenth arrangement, respectively, in the above list of arrangements for a minimum slot count $ns_{min}$=3, according to an embodiment of the present invention. In FIGS. 8–17, it is assumed that the wavelength increases from left to right along the horizontal axis. Moreover, it is assumed that the wavelength increases, or light frequency decreases, from left to right.

Usually, actual $\lambda_o$ varies along the longitudinal direction of the fiber. The arrangement in which the maximum power of the adjacent FWM light is small when the slot number at which $\lambda_o$ is located is small, is the eight arrangement shown in FIG. 15. Therefore, when $\lambda_o$ or the center value of $\lambda_o$ variation is located in the shorter wavelength region of the signal band, the eighth arrangement {5, 10, 8, 4, 7, 6, 3} for $ns_{min}$=3 (see the eight arrangement in the above list of arrangements) is preferable since the maximum value of the adjacent FWM light is small.

Figure 8:
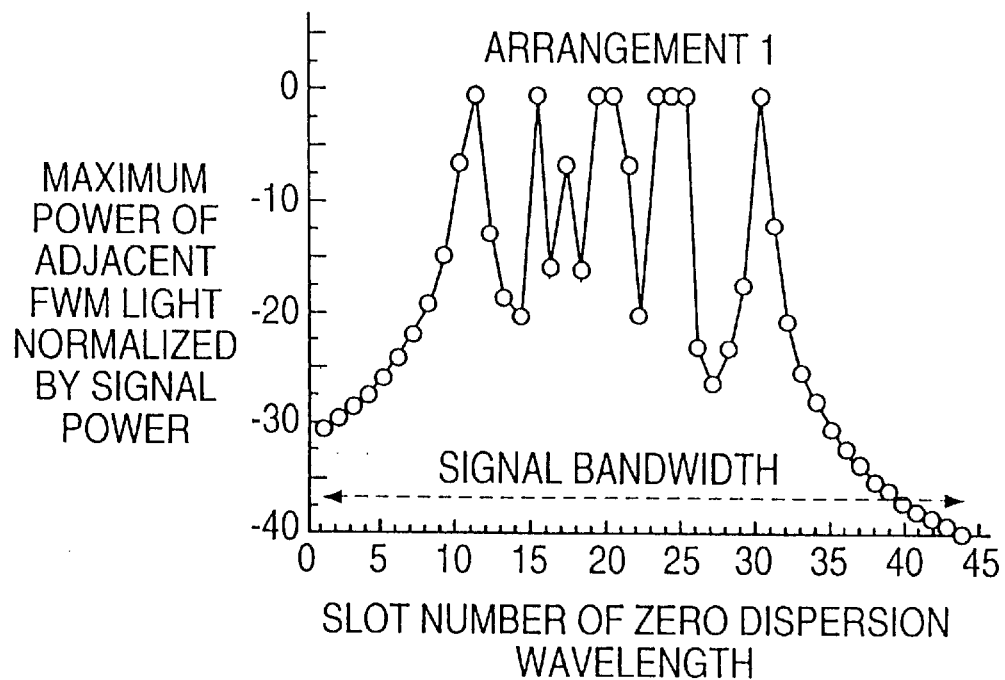
FIG. 8 is a graph illustrating the relationship between zero dispersion wavelength and adjacent FWM light power for a first arrangement when a minimum slot count, $ns_{min}$, equals three (3), according to an embodiment of the present invention.
Figure 9:
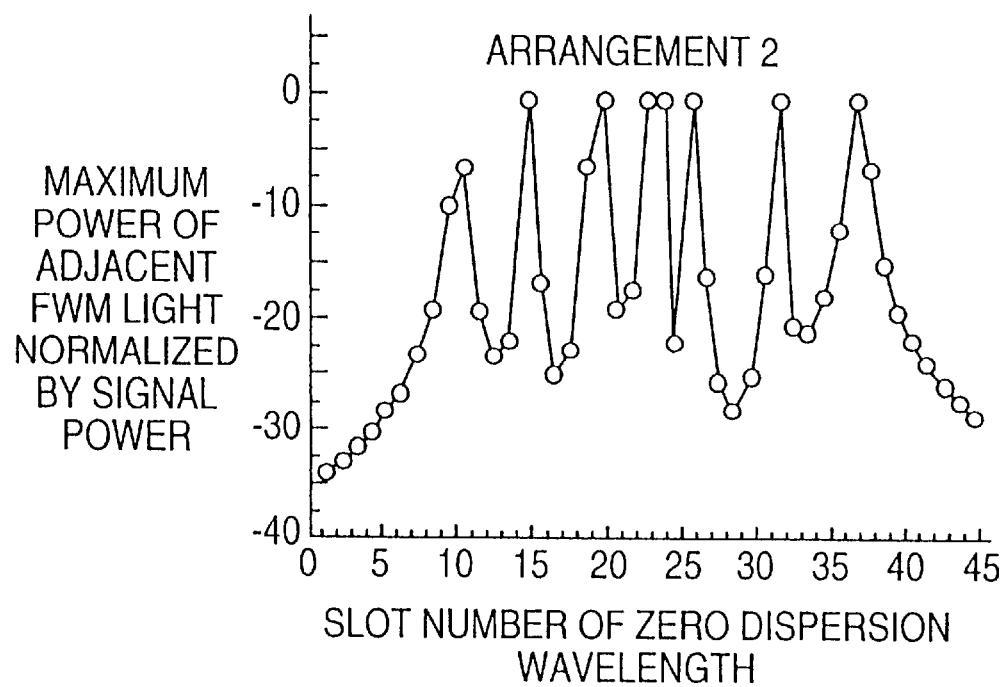
FIG. 9 is a graph illustrating the relationship between zero dispersion wavelength and adjacent FWM light power for a second arrangement when a minimum slot count, $ns_{min}$, equals three (3), according to an embodiment of the present invention.

The arrangement in which the maximum power of the adjacent FWM light is small when the slot number at which $\lambda_o$ is located is large, is the arrangement shown in FIG. 8. Therefore, when $\lambda_o$ or the center value of $\lambda_o$ variation is located in the longer wavelength region of the signal band, the first arrangement {3, 6, 7, 4, 8, 10, 5} is preferable.

Figure 10:
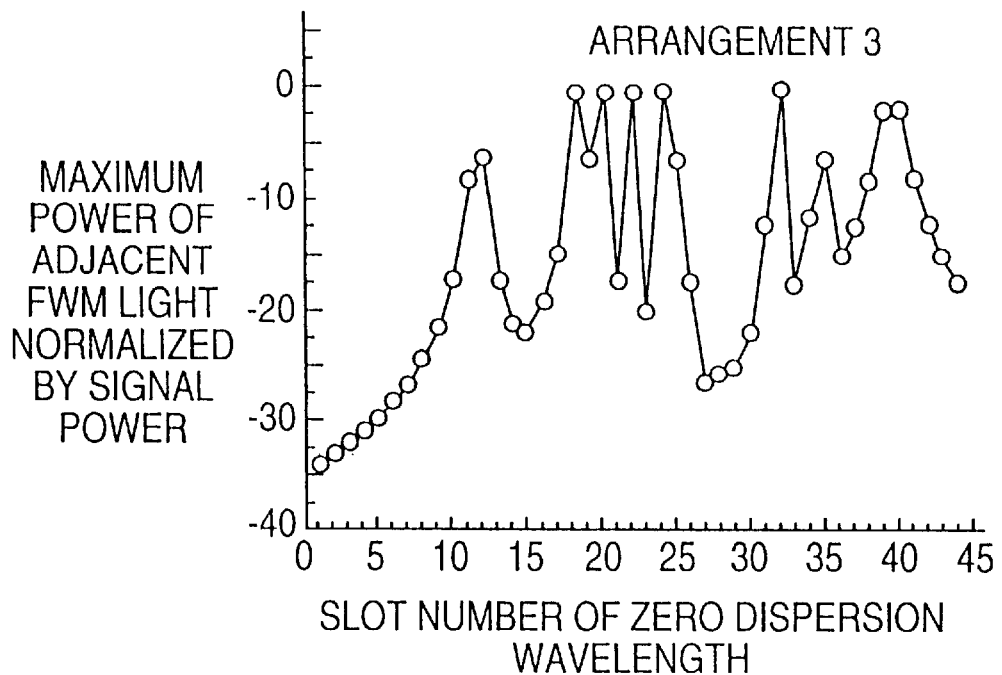
FIG. 10 is a graph illustrating the relationship between zero dispersion wavelength and adjacent FWM light power for a third arrangement when a minimum slot count, $ns_{min}$, equals three (3) according to an embodiment of the present invention.
Figure 11:
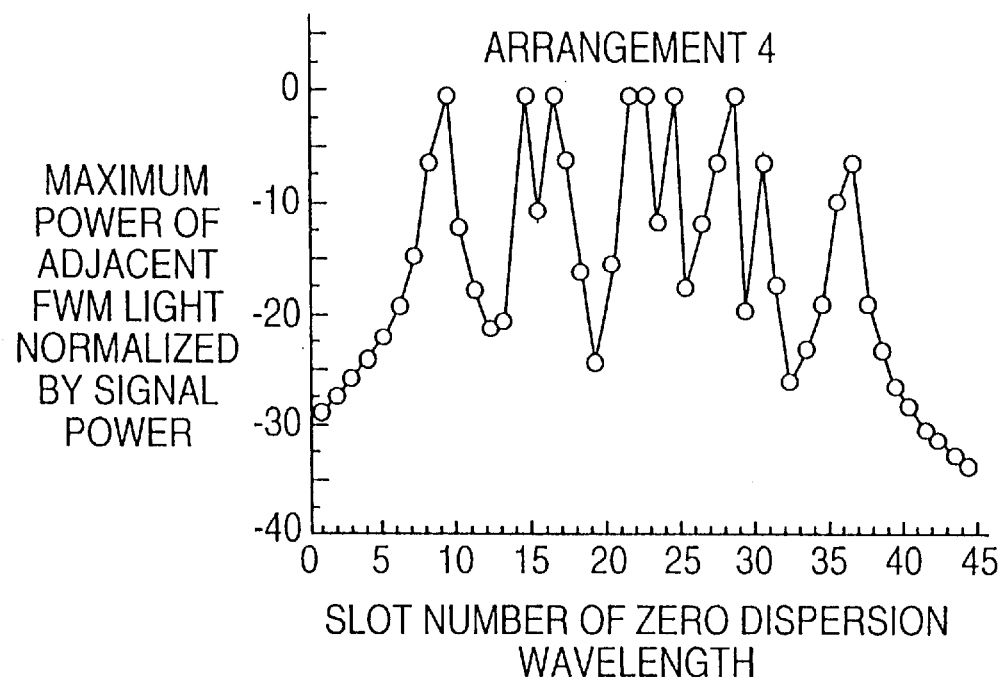
FIG. 11 is a graph illustrating the relationship between zero dispersion wavelength and adjacent FWM light power for a fourth arrangement when a minimum slot count, $ns_{min}$, equals three (3), according to an embodiment of the present invention.
Figure 12:
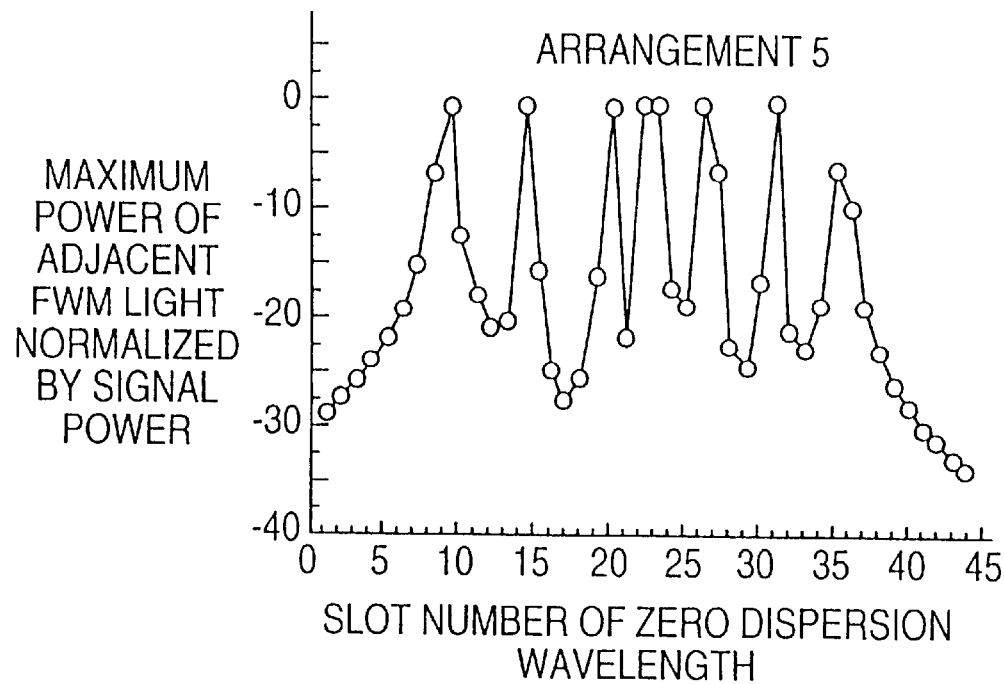
FIG. 12 is a graph illustrating the relationship between zero dispersion wavelength and adjacent FWM light power for a fifth arrangement when a minimum slot count, $ns_{min}$, equals three (3) according to an embodiment of the present invention.
Figure 13:
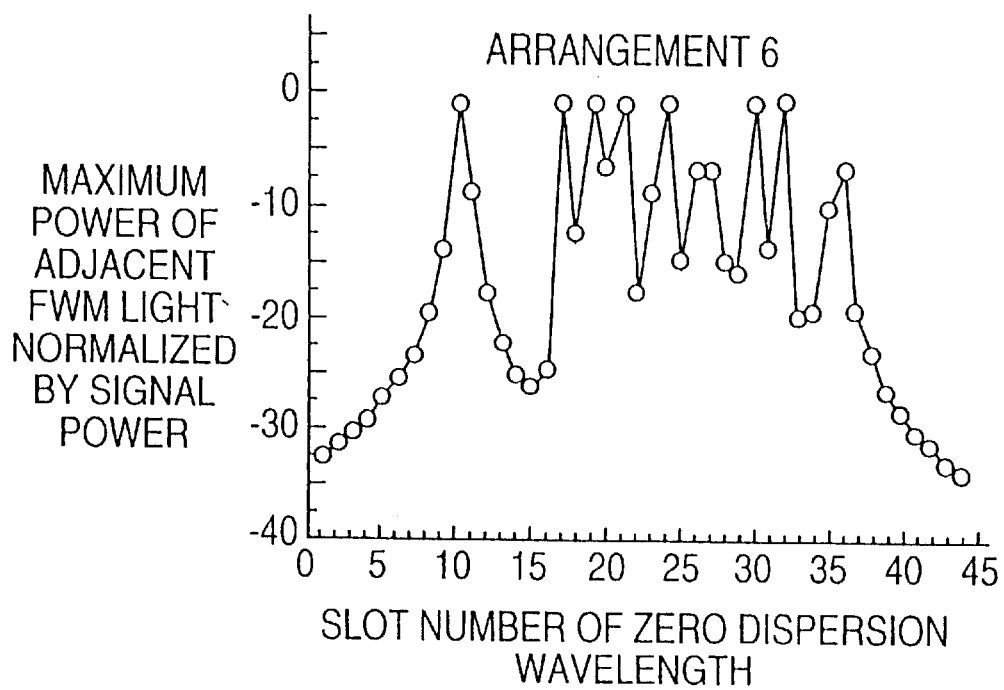
FIG. 13 is a graph illustrating the relationship between zero dispersion wavelength and adjacent FWM light power for a sixth arrangement when a minimum slot count, $ns_{min}$, equals three (3), according to an embodiment of the present invention.
Figure 14:
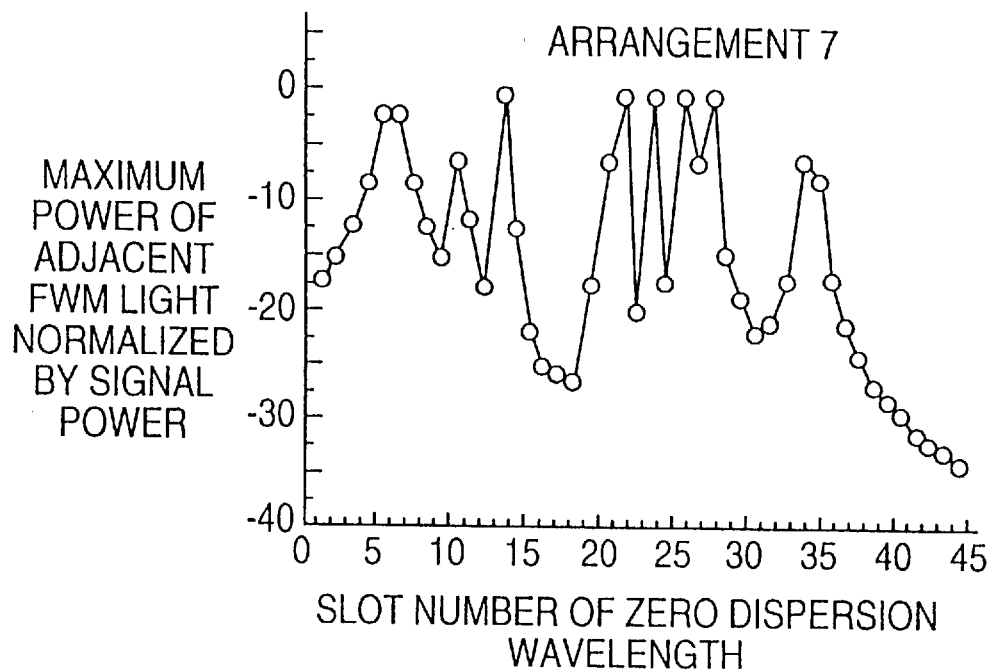
FIG. 14 is a graph illustrating the relationship between zero dispersion wavelength and adjacent FWM light power for a seventh arrangement when a minimum slot count, $ns_{min}$, equals three (3), according to an embodiment of the present invention.
Figure 15:
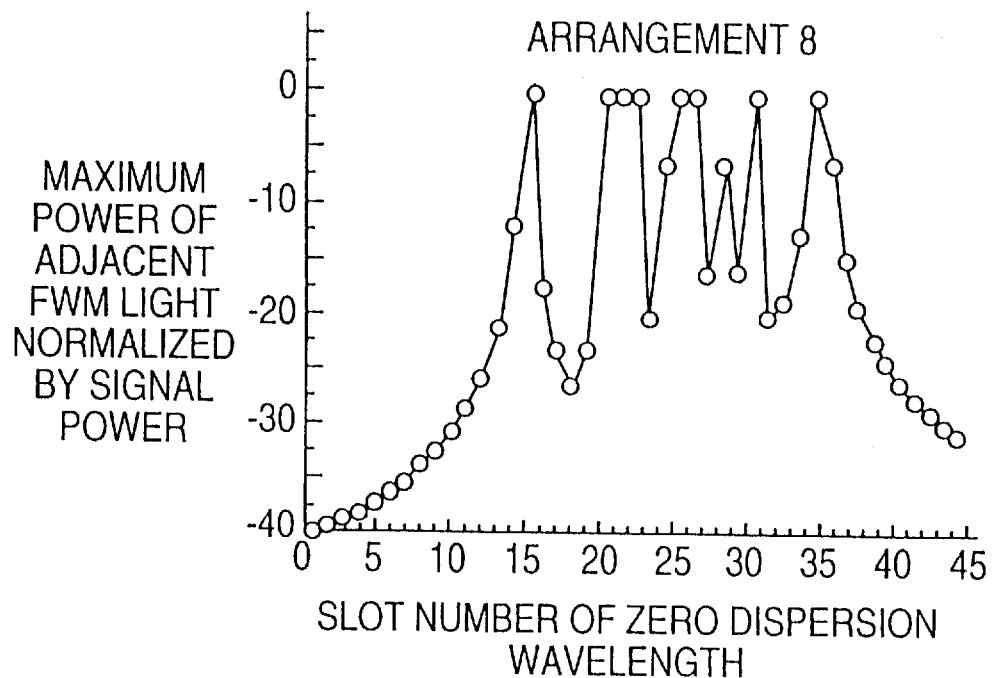
FIG. 15 is a graph illustrating the relationship between zero dispersion wavelength and adjacent FWM light power for an eighth arrangement when a minimum slot count, $ns_{min}$, equals three (3), according to an embodiments of the present invention.
Figure 16:
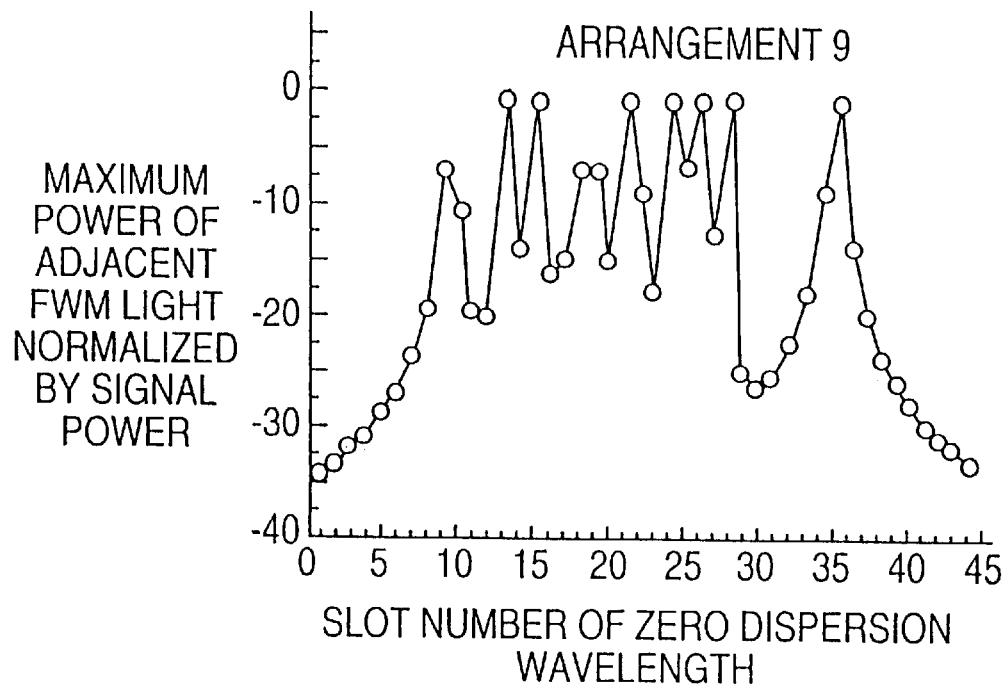
FIG. 16 is a graph illustrating the relationship between zero dispersion wavelength and adjacent FWM light power for a ninth arrangement when a minimum slot count, $ns_{min}$, equals three (3), according to an embodiment of the present invention.
Figure 17:
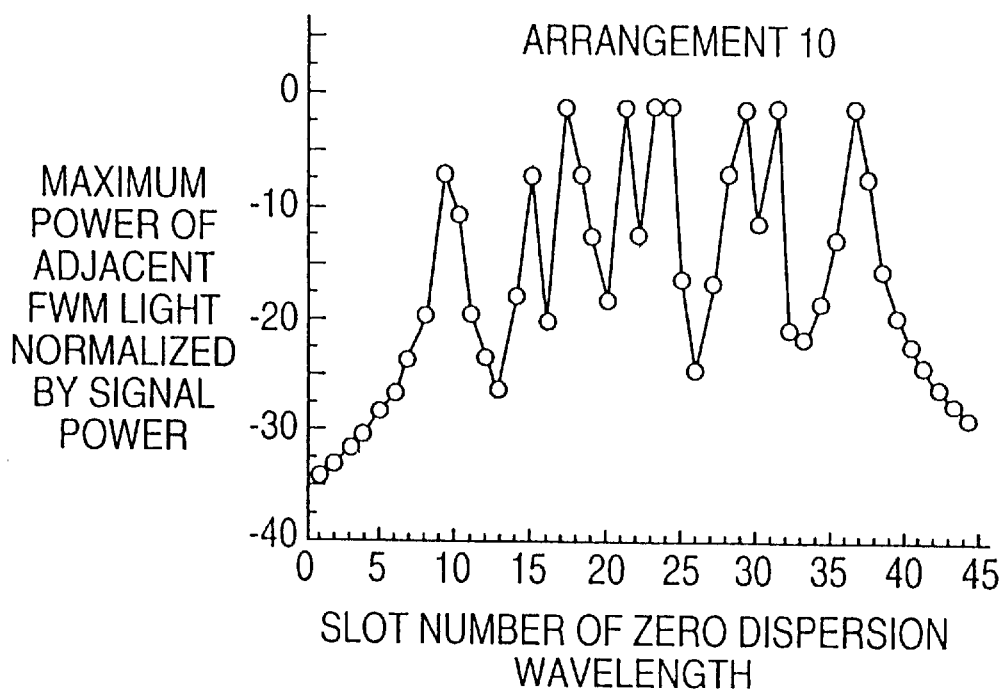
FIG. 17 is a graph illustrating the relationship between zero dispersion wavelength and adjacent FWM light power for a tenth arrangement when a minimum slot count, $ns_{min}$, equals three (3), according to an embodiment of the present invention.

The arrangements in which the number of maximum values near 0 dB is small are the arrangements shown in FIGS. 10 and 14. Therefore, when $\lambda_o$ is located near the center, $\lambda_o$ is uncertain or regardless of the location of $\lambda_o$, to reduce the effect of crosstalk to a relatively small level, the third and seventh arrangements {3, 8, 7, 6, 10, 4, 5} and {5, 4, 10, 6, 7, 8, 3} are preferable.

According to the above embodiments of the present invention, a plurality of optical signals at different wavelengths are multiplexed together. Light frequencies of at least three of the plurality of optical signals are arranged so that differences between any two light frequencies are different from one another.

According to the above embodiments of the present invention, slots are set at intervals of $\Delta f_{S-F}$, and channels are arranged in selected slots at light frequencies $f_1$ to $f_n$. Differences between light frequencies are determined by $m_1$, $m_2$, ... $m_n$ representing the number of slots between the light frequencies. $m_1$, $m_2$, ..., $m_{n-1}$ are determined so that the light frequency differences are different from one another and so that the sum, $m_1+m_2 ... m_{n-1}$, is minimized.

Therefore, according to the above embodiments of the present invention, a channel arrangement can be provided within a narrow signal band near $\lambda_o$ and stable transmission can be achieved while avoiding the effect of crosstalk due to FWM. Furthermore, since channels are arranged at unequally space intervals along slots arranged at equally spaced intervals, the invention is compatible with a specification grid of wavelength arrangements as being defined and recommended by the international telecommunication standard ITU.

According to the above embodiments of the present invention, an optical transmitting device combines a plurality of signal lights, each having a different, corresponding, frequency, into a wavelength division multiplexed signal light. The difference in frequencies of any pair-combination of the signal lights is different from the difference in frequencies between any other pair-combination of the signal lights. Therefore, for example, signal lights in addition to the "plurality of signal lights" can be combined into the wavelength division multiplexed signal light. However, the embodiments of the present invention only requires that the "plurality of signal lights", that is, a subset of all the signal lights combined into the wavelength division multiplexed signal, have frequencies arranged in the required manner. Therefore, for example, if one of the signal lights is very low power, or used for monitoring purposes, it may not be required for this signal light to meet the required frequency spacing.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical transmitting device which combines a plurality of signal lights, each having a different, corresponding, frequency, into a wavelength division multiplexed signal light, wherein the difference in frequencies of each pair-combination of the plurality of signal lights is different from the difference in frequencies between every other pair-combination of the plurality of signal lights, and the plurality of signal lights generate a plurality of four wave mixing (FWM) lights, a power of a respective FWM light of the plurality of FWM lights having the smallest frequency spacing from a signal light being smaller than powers of the other FWM lights.

2. An optical transmitting device as in claim 1, wherein the plurality of signal lights includes n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, and $m_1$ through $m_{n-1}$ are different from each other.

3. An optical transmitting device as in claim 2, wherein $m_1$ through $m_{n-1}$ and the sum of any consecutive (n−2) spacing coefficients $m_1$ through $m_{n-1}$ are different from each other.

4. An optical transmitting device as in claim 2, wherein $m_1$ through $m_{n-1}$ are selected to minimize the sum of $m_1$ through $m_{n-1}$.

5. An optical transmitting device as in claim 3, wherein $m_1$ through $m_{n-1}$ are selected to minimize the sum of $m_1$ through $m_{n-1}$.

6. An optical transmitting device as in claim 1, wherein the difference in frequencies of any pair-combination of the plurality of signal lights is greater than or equal to a minimum frequency difference amount, and the frequencies of the plurality of signal lights are arranged in order along a frequency spectrum with adjacent frequencies along the frequency spectrum being separated by integer multiples of the minimum frequency difference.

7. An optical transmitting device as in claim 1, wherein the plurality of signal lights include n signal lights having respectively corresponding frequencies $f_1$ through $f_n$ arranged in order from $f_1$ to $f_n$ along a frequency spectrum, and frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a minimum difference between two frequencies.

8. An optical transmitting device as in claim 7, wherein n equals 8.

9. An optical transmitting device as in claim 7, wherein n equals 8, and the smallest spacing coefficient $m_1$ through $m_{n-1}$ is equal to 2, 3 or 4.

10. An optical transmitting device as in claim 7, wherein n equals 8, and spacing coefficients $m_1$ to $m_7$ equal 5, 10, 8, 4, 7, 6 and 3, respectively.

11. An optical transmitting device as in claim 7, wherein n equals 8, and spacing coefficients $m_1$ to $m_7$ equal 3, 6, 7, 4, 8, 10 and 5, respectively.

12. An optical transmitting device as in claim 7, wherein n equals 8, and spacing coefficients $m_1$ to $m_7$ equal 3, 8, 7, 6, 10, 4 and 5, respectively.

13. An optical transmitting device as in claim 7, wherein n equals 8, and spacing coefficients $m_1$ to $m_7$ equal 5, 4, 10, 6, 7, 8 and 3, respectively.

14. An optical transmitting device as in claim 1, wherein the difference in frequencies of any pair-combination of the plurality of signal lights is greater than or equal to approximately 50 GHz.

15. An optical transmitting device as in claim 2, wherein the minimum value of $\Delta f_{S-F}$ is approximately 50 GHz.

16. An optical transmitting device as in claim 2, wherein n equals 3.

17. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein the difference in frequencies of each pair-combination of the signal lights is different from the difference in frequencies between every other pair-combination of the signal lights, and the combined signal lights generate a plurality of four wave mixing (FWM) lights, a power of a respective FWM light of the plurality of FWM lights having the smallest frequency spacing from a signal light being smaller than powers of the other FWM lights.

18. An optical communication system as in claim 17, wherein the signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a unit of spacing between frequencies, and $m_1$ through $m_{n-1}$ are different from each other.

19. An optical communication system as in claim 18, wherein $m_1$ through $m_{n-1}$ and the sum of any consecutive (n−2) spacing coefficients $m_1$ through $m_{n-1}$ are different from each other.

20. An optical communication system as in claim 18, wherein $m_1$ through $m_{n-1}$ are selected to minimize the sum of $m_1$ through $m_{n-1}$.

21. An optical communication system as in claim 19, wherein $m_1$ through $m_{n-1}$ are selected to minimize the sum of $m_1$ through $m_{n-1}$.

22. An optical communication system as in claim 17, wherein the difference in frequencies of any pair-combination of the signal lights is greater than or equal to a minimum frequency difference amount, and the frequencies of the signal lights are arranged in order along a frequency spectrum with adjacent frequencies along the frequency spectrum being separated by integer multiples of the minimum frequency difference.

23. An optical communication system as in claim 17, wherein the signal lights include n signal lights having respectively corresponding frequencies $f_1$ through $f_n$ arranged in order from $f_1$ to $f_n$ along a frequency spectrum, and frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a minimum difference between two frequencies.

24. An optical communication system as in claim 23, wherein n equals 8.

25. An optical communication system as in claim 23, wherein n equals 8, and the smallest spacing coefficient $m_1$ through $m_{n-1}$ is equal to 2, 3 or 4.

26. An optical communication system as in claim 23, wherein n equals 8, and spacing coefficients $m_1$ to $m_7$ equal 5, 10, 8, 4, 7, 6 and 3, respectively.

27. An optical communication system as in claim 23, wherein n equals 8, and spacing coefficients $m_1$ to $m_7$ equal 3, 6, 7, 4, 8, 10 and 5, respectively.

28. An optical communication system as in claim 23, wherein n equals 8, and spacing coefficients $m_1$ to $m_7$ equal 3, 8, 7, 6, 10, 4 and 5, respectively.

29. An optical communication system as in claim 23, wherein n equals 8, and spacing coefficients $m_1$ to $m_7$ equal 5, 4, 10, 6, 7, 8 and 3, respectively.

30. An optical communication system as in claim 17, wherein the difference in frequencies of any pair-combination of the signal lights is greater than or equal to approximately 50 GHz.

31. An optical communication system as in claim 18, wherein the minimum value of $\Delta f_{S-F}$ is approximately 50 GHz.

32. An optical communication system as in claim 18, wherein n equals 3.

33. An optical transmitting device for combining first, second and third signal lights, each having a different, corresponding, frequency, into a wavelength division multiplexed signal light, wherein
   the difference in frequencies of each pair-combination of the first, second and third signal lights is different from the difference in frequencies between every other pair-combination of the first, second and third signal lights, and
   the first, second and third signal lights generate a plurality of four wave mixing (FWM) lights, a power of a respective FWM light of the plurality of FWM lights having the smallest frequency spacing from a signal light of the first, second and third signal lights being smaller than powers of the other FWM lights.

34. An optical transmitting device as in claim 33, wherein
   the first, second and third signal lights have frequencies $f_1$, $f_2$ and $f_3$, respectively, arranged in order from $f_1$ to $f_3$ along a frequency spectrum,
   frequencies $f_1$ and $f_2$ have respectively corresponding integer spacing coefficients $m_1$ and $m_2$, frequency $f_2$ is separated by $m_1 \cdot \Delta f_{S-F}$ from frequency $f_1$, and frequency $f_3$ is separated by $m_2 \cdot \Delta f_{S-F}$ from frequency $f_2$, where $\Delta f_{S-F}$ is a unit of spacing between frequencies, and
   $m_1$ and $m_2$ are different from each other.

35. An optical transmitting device for combining a plurality of signal lights, each having a different, corresponding, frequency, into a wavelength division multiplexed signal light, wherein
   the frequencies of a first arbitrary pair of signal lights of the plurality of signal lights have a frequency difference defined as a first frequency difference;
   the frequencies of a second arbitrary pair of signal lights of the plurality of signal lights, and different from the first arbitrary pair, have a frequency difference defined as a second frequency difference;
   the absolute value of the first frequency difference is different from the absolute value of second frequency difference, for every arbitrary pair of signal lights of the plurality of signal lights, and
   the plurality of signal lights generate a plurality of four wave mixing (FWM) lights, a power of a respective FWM light of the plurality of FWM lights having the smallest frequency spacing from a signal light being smaller than powers of the other FWM lights.

36. An optical transmitting device as in claim 35, wherein
   the plurality of signal lights includes n signal lights having respectively corresponding frequencies $f_1$ through $f_n$ arranged in order from $f_1$ to $f_n$ along a frequency spectrum,
   frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, and
   $m_1$ through $m_{n-1}$ are different from each other.

37. An optical transmitting device as in claim 36, wherein $m_1$ through $m_{n-1}$ and the sum of any consecutive (n−2) spacing coefficients $m_1$ through $m_{n-1}$ are different from each other.

38. An optical transmitting device as in claim 36, wherein $m_1$ through $m_{n-1}$ are selected to minimize the sum of $m_1$ through $m_{n-1}$.

39. An optical transmitting device as in claim 37, wherein $m_1$ through $m_{n-1}$ are selected to minimize the sum of $m_1$ through $m_{n-1}$.

40. An optical transmitting device as in claim 35, wherein
   the difference in frequencies of any arbitrary pair of signal lights of the plurality of signal lights is greater than or equal to a minimum frequency difference amount, and
   the frequencies of the signal lights are arranged in order along a frequency spectrum with adjacent frequencies along the frequency spectrum being separated by integer multiples of the minimum frequency difference.

41. An optical transmitting device as in claim 35, wherein
   the plurality of signal lights includes n signal lights having respectively corresponding frequencies $f_1$ through $f_n$ arranged in order from $f_1$ to $f_n$ along a frequency spectrum, and
   frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a minimum difference between two frequencies.

42. A method comprising the steps of:
   providing a plurality of signal lights, each signal light having a different, corresponding, frequency, wherein the difference in frequencies of each pair-combination of the plurality of signal lights is different from the difference in frequencies between every other pair-combination of the plurality of signal lights; and
   combining the plurality of signal lights into a wavelength division multiplexed signal light, wherein the combined plurality of signal lights generate a plurality of four wave mixing (FWM) lights, a power of a respective FWM light of the plurality of FWM lights having the smallest frequency spacing from a signal light being smaller than powers of the other FWM lights.

43. A method as in claim 42, wherein the step of providing includes the step of:
   providing the plurality of signal lights to include n signal lights having respectively corresponding frequencies $f_1$ through $f_n$ arranged in order from $f_1$ to $f_n$ along a frequency spectrum, where
   frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, and $m_1$ through $m_{n-1}$ are different from each other.

44. A method as in claim 43, wherein the step of providing includes the step of:
   providing the plurality of signal lights so that $m_1$ through $m_{n-1}$ and the sum of any consecutive (n−2) spacing coefficients $m_1$ through $m_{n-1}$ are different from each other.

45. A method as in claim 43, wherein the step of providing includes the step of:
   providing the plurality of signal lights so that $m_1$ through $m_{n-1}$ are selected to minimize the sum of $m_1$ through $m_{n-1}$.

46. A method as in claim 44, wherein the step of providing includes the step of:
   providing the plurality of signal lights so that $m_1$ through $m_{n-1}$ are selected to minimize the sum of $m_1$ through $m_{n-1}$.

47. An optical transmitting device which combines a plurality of signal lights, each having a different, corresponding, frequency, into a wavelength division multiplexed signal light, wherein, for at least three signal lights of the plurality of signal lights, the difference in frequencies of any pair-combination of the at least three signal lights is different from the difference in frequencies between any other pair-combination of the at least three signal lights, the at least three signal lights includes n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, $m_1$ through $m_{-1}$ are different from each other, and the at least three signal lights generate a plurality of four wave mixing (FWM) lights, a power of a respective FWM light of the plurality of FWM lights having the smallest frequency spacing from a signal light being smaller than powers of the other FWM lights.

48. An optical transmitting device as in claim 47, wherein $m_1$ through $m_{n-1}$ and the sum of any consecutive (n−2) spacing coefficients $m_1$ through $m_{n-1}$ are different from each other.

49. An optical transmitting device as in claim 47, wherein $m_1$ through $m_{n-1}$ are selected to minimize the sum of $m_1$ through $m_{n-1}$.

50. An optical transmitting device as in claim 48, wherein $m_1$ through $m_{n-1}$ are selected to minimize the sum of $m_1$ through $m_{n-1}$.

51. An optical transmitting device which combines a plurality of signal lights, each having a different, corresponding, frequency, into a wavelength division multiplexed signal light, wherein, for at least three signal lights of the plurality of signal lights, the difference in frequencies of any pair-combination of the at least three signal lights is different from the difference in frequencies between any other pair-combination of the at least three signal lights, the difference in frequencies of any pair-combination of the at least three signal lights is greater than or equal to a minimum frequency difference amount, the frequencies of the at least three signal lights are arranged in order along a frequency spectrum with adjacent frequencies along the frequency spectrum being separated by integer multiples of the minimum frequency difference, and the at least three signal lights generate a plurality of four wave mixing (FWM) lights, a power of a respective FWM light of the plurality of FWM lights having the smallest frequency spacing from a signal light being smaller than powers of the other FWM lights.

52. An optical transmitting device which combines a plurality of signal lights, each having a different, corresponding, frequency, into a wavelength division multiplexed signal light, wherein, for at least three signal lights of the plurality of signal lights, the difference in frequencies of any pair-combination of the at least three signal lights is different from the difference in frequencies between any other pair-combination of the at least three signal lights, the at least three signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a minimum difference between two frequencies, and the at least three signal lights generate a plurality of four wave mixing (FWM) lights, a power of a respective FWM light of the plurality of FWM lights having the smallest frequency spacing from a signal light being smaller than powers of the other FWM lights.

53. An optical transmitting device as in claim 52, wherein n equals 8.

54. An optical transmitting device as in claim 52, wherein n equals 8, and the smallest spacing coefficient $m_1$ through $m_{n-1}$ is equal to 2, 3 or 4.

55. An optical transmitting device as in claim 52, wherein n equals 8, and spacing coefficients $m_1$ to $m_7$ equal 5, 10, 8, 4, 7, 6 and 3, respectively.

56. An optical transmitting device as in claim 52, wherein n equals 8, and spacing coefficients $m_1$ to $m_7$ equal 3, 6, 7, 4, 8, 10 and 5, respectively.

57. An optical transmitting device as in claim 52, wherein n equals 8, and spacing coefficients $m_1$ to $m_7$ equal 3, 8, 7, 6, 10, 4 and 5, respectively.

58. An optical transmitting device as in claim 52, wherein n equals 8, and spacing coefficients $m_1$ to $m_7$ equal 5, 4, 10, 6, 7, 8 and 3, respectively.

59. An optical transmitting device which combines a plurality of signal lights, each having a different, corresponding, frequency, into a wavelength division multiplexed signal light, wherein, for at least three signal lights of the plurality of signal lights, the difference in frequencies of any pair-combination of the at least three signal lights is different from the difference in frequencies between any other pair-combination of the at least three signal lights, the difference in frequencies of any pair-combination of the at least three signal lights is greater than or equal to approximately 50 GHz, and the at least three signal lights generate a plurality of four wave mixing (FWM) lights, a power of a respective FWM light of the plurality of FWM lights having the smallest frequency spacing from a signal light being smaller than powers of the other FWM lights.

60. An optical transmitting device as in claim 47, wherein the minimum value of $\Delta f_{S-F}$ is approximately 50 GHz.

61. An optical transmitting device as in claim 47, wherein n equals 3.

62. An optical transmitting device which combines a plurality of signal lights, each having a different, corresponding, frequency, into a wavelength division multiplexed signal light, wherein, for at least three signal lights of the plurality of signal lights, the difference in frequencies of each pair-combination of the at least three signal lights is different from the difference in frequencies between every other pair-combination of the at least three signal lights, the at least three signal lights includes all of the plurality of signal lights, and the at least three signal lights generate a plurality of four wave mixing (FWM) lights, a power of a respective FWM light of the plurality of FWM lights having the smallest frequency spacing from a signal light being smaller than powers of the other FWM lights.

63. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein, for at least three signal lights produced by the transmitters, the difference in frequencies of any pair-combination of at the least three signal lights is different from the difference in frequencies between any other pair-combination of the at least three signal lights, the at least three signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$ and frequencies $f_i$ and $f_{i+1}$ are separated by $m_i \cdot \Delta f_{S-F}$, where i=1 to (n-1) and $\Delta f_{S-F}$ is a unit of spacing between frequencies, $m_1$ through $m_{n-1}$ are different from each other, and the at least three signal lights generate a plurality of four wave mixing (FWM) lights, a power of a respective FWM light of the plurality of FWM lights having the smallest frequency spacing from a signal light being smaller than powers of the other FWM lights.

64. An optical communication system as in claim 63, wherein $m_1$ through $m_{n-1}$ and the sum of any consecutive (n−2) spacing coefficients $m_1$ through $m_{n-1}$ are different from each other.

65. An optical communication system as in claim 63, wherein $m_1$ through $m_{n-1}$ are selected to minimize the sum of $m_1$ through $m_{n-1}$.

66. An optical communication system as in claim 64, wherein $m_1$ through $m_{n-1}$ are selected to minimize the sum of $m_1$ through $m_{n-1}$.

67. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein, for at least three signal lights produced by the transmitters, the difference in frequencies of any pair-combination of at the least three signal lights is different from the difference in frequencies between any other pair-combination of the at least three signal lights, the difference in frequencies of any pair-combination of the at least three signal lights is greater than or equal to a minimum frequency difference amount, the frequencies of the at least three signal lights are arranged in order along a frequency spectrum with adjacent frequencies along the frequency spectrum being separated by integer multiples of the minimum frequency difference, and the at least three signal lights generate a plurality of four wave mixing (FWM) lights, a power of a respective FWM light of the plurality of FWM lights having the smallest frequency spacing from a signal light being smaller than powers of the other FWM lights.

68. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein, for at least three signal lights produced by the transmitters, the difference in frequencies of any pair-combination of at the least three signal lights is different from the difference in frequencies between any other pair-combination of the at least three signal lights, the at least three signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a minimum difference between two frequencies, and the at least three signal lights generate a plurality of four wave mixing (FWM) lights, a power of a respective FWM light of the plurality of FWM lights having the smallest frequency spacing from a signal light being smaller than powers of the other FWM lights.

69. An optical communication system as in claim 68, wherein n equals 8.

70. An optical communication system as in claim 68, wherein n equals 8, and
the smallest spacing coefficient $m_1$ through $m_{n-1}$ is equal to 2, 3 or 4.

71. An optical communication system as in claim 68, wherein
n equals 8, and
spacing coefficients $m_1$ to $m_7$ equal 5, 10, 8, 4, 7, 6 and 3, respectively.

72. An optical communication system as in claim 68, wherein
n equals 8, and
spacing coefficients $m_1$ to $m_7$ equal 3, 6, 7, 4, 8, 10 and 5, respectively.

73. An optical communication system as in claim 68, wherein
n equals 8, and
spacing coefficients $m_1$ to $m_7$ equal 3, 8, 7, 6, 10, 4 and 5, respectively.

74. An optical communication system as in claim 68, wherein
n equals 8, and
spacing coefficients $m_1$ to $m_7$ equal 5, 4, 10, 6, 7, 8 and 3, respectively.

75. An optical communication system comprising:
transmitters which produce signal lights, each signal light having a different, corresponding, frequency;
a multiplexing device which combines the signal lights into a wavelength division multiplexed signal light;
an optical fiber transmission line which receives the wavelength division multiplexed signal light from the multiplexing device;
a demultiplexing device which receives the wavelength division multiplexed signal light from the optical fiber transmission line and demultiplexes the received wavelength division multiplexed signal light into individual signal lights; and
a receiver which receives at least one of the individual signal lights from the demultiplexing device, wherein,
for at least three signal lights produced by the transmitters, the difference in frequencies of any pair-combination of at the least three signal lights is different from the difference in frequencies between any other pair-combination of the at least three signal lights,
the difference in frequencies of any pair-combination of the at least three signal lights is greater than or equal to approximately 50 GHz, and
the at least three signal lights generate a plurality of four wave mixing (FWM) lights, a power of a respective FWM light of the plurality of FWM lights having the smallest frequency spacing from a signal light being smaller than powers of the other FWM lights.

76. An optical communication system as in claim 63, wherein the minimum value of $\Delta f_{S-F}$ is approximately 50 GHz.

77. An optical communication system as in claim 63, wherein n equals 3.

78. A method comprising the steps of:
providing a plurality of signal lights, each signal light having a different, corresponding, frequency, wherein, for at least three signal lights of the plurality of signal lights, the difference in frequencies of any pair-combination of the at least three signal lights is different from the difference in frequencies between any other pair-combination of the at least three signal lights; and
combining the at least three signal lights into a wavelength division multiplexed signal light, the combined signal lights generating a plurality of four wave mixing (FWM) lights, a power of a respective FWM light of the plurality of FWM lights having the smallest frequency spacing from a signal light being smaller than powers of the other FWM lights, wherein the step of providing includes
providing the at least three signal lights to include n signal lights having respectively corresponding frequencies $f_1$ through $f_n$ arranged in order from $f_1$ to $f_n$ along a frequency spectrum, where frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, and $m_1$ through $m_{n-1}$ are different from each other.

79. A method as in claim 78, wherein the step of providing includes
providing the at least three signal lights so that $m_1$ through $m_{n-1}$ and the sum of any consecutive (n−2) spacing coefficients $m_1$ through $m_{n-1}$ are different from each other.

80. A method as in claim 78, wherein the step of providing includes
providing the at least three signal lights so that $m_1$ through $m_{n-1}$ are selected to minimize the sum of $m_1$ through $m_{n-1}$.

81. A method as in claim 79, wherein the step of providing includes
providing the at least three signal lights so that $m_1$ through $m_{n-1}$ are selected to minimize the sum of $m_1$ through $m_{n-1}$.

82. An optical transmitting device which combines a plurality of signal lights, each having a different, corresponding, frequency, into a wavelength division multiplexed signal light, wherein
the difference in frequencies of any pair-combination of the plurality of signal lights is different from the difference in frequencies between any other pair-combination of the plurality of signal lights,
the plurality of signal lights includes n signal lights having respectively corresponding frequencies $f_1$ through $f_n$ arranged in order from $f_1$ to $f_n$ along a frequency spectrum,
frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies,
$m_1$ through $m_{n-1}$ are different from each other, and
the plurality of signal lights generate a plurality of four wave mixing (FWM) lights, a power of a respective FWM light of the plurality of FWM lights having the smallest frequency spacing from a signal light being smaller than powers of the other FWM lights.

83. An optical transmitting device as in claim 82, wherein $m_1$ through $m_{n-1}$ and the sum of any consecutive (n−2) spacing coefficients $m_1$ through $m_{n-1}$ are different from each other.

84. An optical transmitting device as in claim 82, wherein $m_1$ through $m_{n-1}$ are selected to minimize the sum of $m_1$ through $m_{n-1}$.

85. An optical transmitting device as in claim 83, wherein $m_1$ through $m_{n-1}$ are selected to minimize the sum of $m_1$ through $m_{n-1}$.

86. An optical transmitting device which combines a plurality of signal lights, each having a different, corresponding, frequency, into a wavelength division multiplexed signal light, wherein the difference in frequencies of any pair-combination of the plurality of signal lights is different from the difference in frequencies between any other pair-combination of the plurality of signal lights, the difference in frequencies of any pair-combination of the plurality of signal lights is greater than or equal to a minimum frequency difference amount, the frequencies of the plurality of signal lights are arranged in order along a frequency spectrum with adjacent frequencies along the frequency spectrum being separated by integer multiples of the minimum frequency difference, and the plurality of signal lights generate a plurality of four wave mixing (FWM) lights, a power of a respective FWM light of the plurality of FWM lights having the smallest frequency spacing from a signal light being smaller than powers of the other FWM lights.

87. An optical transmitting device which combines a plurality of signal lights, each having a different, corresponding, frequency, into a wavelength division multiplexed signal light, wherein the difference in frequencies of any pair-combination of the plurality of signal lights is different from the difference in frequencies between any other pair-combination of the plurality of signal lights, the plurality of signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a minimum difference between two frequencies, and the plurality of signal lights generate a plurality of four wave mixing (FWM) lights, a power of a respective FWM light of the plurality of FWM lights having the smallest frequency spacing from a signal light being smaller than powers of the other FWM lights.

88. An optical transmitting device as in claim 87, wherein n equals 8.

89. An optical transmitting device as in claim 87, wherein n equals 8, and the smallest spacing coefficient $m_1$ through $m_{n-1}$ is equal to 2, 3 or 4.

90. An optical transmitting device as in claim 87, wherein n equals 8, and spacing coefficients $m_1$ to $m_7$ equal 5, 10, 8, 4, 7, 6 and 3, respectively.

91. An optical transmitting device as in claim 87, wherein n equals 8, and spacing coefficients $m_1$ to $m_7$ equal 3, 6, 7, 4, 8, 10 and 5, respectively.

92. An optical transmitting device as in claim 87, wherein n equals 8, and spacing coefficients $m_1$ to $m_7$ equal 3, 8, 7, 6, 10, 4 and 5, respectively.

93. An optical transmitting device as in claim 87, wherein n equals 8, and spacing coefficients $m_1$ to $m_7$ equal 5, 4, 10, 6, 7, 8 and 3, respectively.

94. An optical transmitting device which combines a plurality of signal lights, each having a different, corresponding, frequency, into a wavelength division multiplexed signal light, wherein the difference in frequencies of any pair-combination of the plurality of signal lights is different from the difference in frequencies between any other pair-combination of the plurality of signal lights, the difference in frequencies of any pair-combination of the plurality of signal lights is greater than or equal to approximately 50 GHz, and the plurality of signal lights generate a plurality of four wave mixing (FWM) lights, a power of a respective FWM light of the plurality of FWM lights having the smallest frequency spacing from a signal light being smaller than powers of the other FWM lights.

95. An optical transmitting device which combines a plurality of signal lights, each having a different, corresponding, frequency, into a wavelength division multiplexed signal light, wherein the difference in frequencies of any pair-combination of the plurality of signal lights is different from the difference in frequencies between any other pair-combination of the plurality of signal lights, the plurality of signal lights includes n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, $m_1$ through $m_{n-1}$ are different from each other, the minimum value $\Delta f_{S-F}$ is approximately 50 GHz, and the plurality of signal lights generate a plurality of four wave mixing (FWM) lights, a power of a respective FWM light of the plurality of FWM lights having the smallest frequency spacing from a signal light being smaller than powers of the other FWM lights.

96. An optical transmitting device which combines a plurality of signal lights, each having a different, corresponding, frequency, into a wavelength division multiplexed signal light, wherein the difference in frequencies of any pair-combination of the plurality of signal lights is different from the difference in frequencies between any other pair-combination of the plurality of signal lights, the plurality of signal lights includes n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, $m_1$ through $m_{n-1}$ are different from each other, n equals 3, and the plurality of signal lights generate a plurality of four wave mixing (FWM) lights, a power of a respective FWM light of the plurality of FWM lights having the smallest frequency spacing from a signal light being smaller than powers of the other FWM lights.

97. An optical communication system comprising:
transmitters which produce signal lights, each signal light having a different, corresponding, frequency;
a multiplexing device which combines the signal lights into a wavelength division multiplexed signal light;
an optical fiber transmission line which receives the wavelength division multiplexed signal light from the multiplexing device;
a demultiplexing device which receives the wavelength division multiplexed signal light from the optical fiber transmission line and demultiplexes the received wavelength division multiplexed signal light into individual signal lights; and
a receiver which receives at least one of the individual signal lights from the demultiplexing device, wherein
the difference in frequencies of any pair-combination of the signal lights is different from the difference in frequencies between any other pair-combination of the signal lights,
the signal lights include n signal lights having respectively corresponding frequencies $f_1$ through $f_n$ arranged in order from $f_1$ to $f_n$ along a frequency spectrum,
frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a unit of spacing between frequencies,
$m_1$ through $m_{n-1}$ are different from each other, and
the combined signal lights generate a plurality of four wave mixing (FWM) lights, a power of a respective FWM light of the plurality of FWM lights having the smallest frequency spacing from a signal light being smaller than powers of the other FWM lights.

98. An optical communication system as in claim 97, wherein $m_1$ though $m_{n-1}$ and the sum of any consecutive (n−2) spacing coefficients $m_1$ through $m_{n-1}$ are different from each other.

99. An optical communication system as in claim 97, wherein $m_1$ through $m_{n-1}$ are selected to minimize the sum of $m_1$ through $m_{n-1}$.

100. An optical communication system as in claim 98, wherein $m_1$ through $m_{n-1}$ are selected to minimize the sum of $m_1$ through $m_{n-1}$.

101. An optical communication system comprising:
transmitters which produce signal lights, each signal light having a different, corresponding, frequency;
a multiplexing device which combines the signal lights into a wavelength division multiplexed signal light;
an optical fiber transmission line which receives the wavelength division multiplexed signal light from the multiplexing device;
a demultiplexing device which receives the wavelength division multiplexed signal light from the optical fiber transmission line and demultiplexes the received wavelength division multiplexed signal light into individual signal lights; and
a receiver which receives at least one of the individual signal lights from the demultiplexing device, wherein
the difference in frequencies of any pair-combination of the signal lights is different from the difference in frequencies between any other pair-combination of the signal lights,
the difference in frequencies of any pair-combination of the signal lights is greater than or equal to a minimum frequency difference amount,
the frequencies of the signal lights are arranged in order along a frequency spectrum with adjacent frequencies along the frequency spectrum being separated by integer multiples of the minimum frequency difference, and
the combined signal lights generate a plurality of four wave mixing (FWM) lights, a power of a respective FWM light of the plurality of FWM lights having the smallest frequency spacing from a signal light being smaller than powers of the other FWM lights.

102. An optical communication system comprising:
transmitters which produce signal lights, each signal light having a different, corresponding, frequency;
a multiplexing device which combines the signal lights into a wavelength division multiplexed signal light;
an optical fiber transmission line which receives the wavelength division multiplexed signal light from the multiplexing device;
a demultiplexing device which receives the wavelength division multiplexed signal light from the optical fiber transmission line and demultiplexes the received wavelength division multiplexed signal light into individual signal lights; and
a receiver which receives at least one of the individual signal lights from the demultiplexing device, wherein
the difference in frequencies of any pair-combination of the signal lights is different from the difference in frequencies between any other pair-combination of the signal lights,
the signal lights include n signal lights having respectively corresponding
frequencies $f_1$ through $f_n$ arranged in order from $f_1$ to $f_n$ along a frequency spectrum, and frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a minimum difference between two frequencies, and
the combined signal lights generate a plurality of four wave mixing (FWM) lights, a power of a respective FWM light of the plurality of FWM lights having the smallest frequency spacing from a signal light be smaller than powers of the other FWM lights.

103. An optical communication system as in claim 102, wherein
n equals 8.

104. An optical communication system as in claim 102, wherein
n equals 8, and
the smallest spacing coefficient $m_1$ through $m_{n-1}$ is equal to 2, 3 or 4.

105. An optical communication system as in claim 102, wherein
n equals 8, and
spacing coefficients $m_1$ to $m_7$ equal 5, 10, 8, 4, 7, 6 and 3, respectively.

106. An optical communication system as in claim 102, wherein
n equals 8, and
spacing coefficients $m_1$ to $m_7$ equal 3, 6, 7, 4, 8, 10 and 5, respectively.

107. An optical communication system as in claim 102, wherein n equals 8, and spacing coefficients $m_1$ to $m_7$ equal 3, 8, 7, 6, 10, 4 and 5, respectively.

108. An optical communication system as in claim 102, wherein n equals 8, and spacing coefficients $m_1$ to $m_7$ equal 5, 4, 10, 6, 7, 8 and 3, respectively.

109. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein the difference in frequencies of any pair-combination of the signal lights is different from the difference in frequencies between any other pair-combination of the signal lights, the difference in frequencies of any pair-combination of the plurality of signal lights is greater than or equal to approximately 50 GHz, and the combined signal lights generate a plurality of four wave mixing (FWM) lights, a power of a respective FWM light of the plurality of FWM lights having the smallest frequency spacing from a signal light being smaller than powers of the other FWM lights.

110. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein the difference in frequencies of any pair-combination of the signal lights is different from the difference in frequencies between any other pair-combination of the signal lights, the signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, $m_1$ through $m_{n-1}$ are different from each other, the minimum value of $\Delta f_{S-F}$ is approximately 50 GHz, and the combined signal lights generate a plurality of four wave mixing (FWM) lights, a power of a respective FWM light of the plurality of FWM lights having the smallest frequency spacing from a signal light being smaller than powers of the other FWM lights.

111. An optical communication system comprising:

transmitters which produce signal lights, each signal light having a different, corresponding, frequency;

a multiplexing device which combines the signal lights into a wavelength division multiplexed signal light;

an optical fiber transmission line which receives the wavelength division multiplexed signal light from the multiplexing device;

a demultiplexing device which receives the wavelength division multiplexed signal light from the optical fiber transmission line and demultiplexes the received wavelength division multiplexed signal light into individual signal lights; and a receiver which receives at least one of the individual signal lights from the demultiplexing device, wherein the difference in frequencies of any pair-combination of the signal lights is different from the difference in frequencies between any other pair-combination of the signal lights, the signal lights include n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n−1) and $\Delta f_{S-F}$ is a unit of spacing between frequencies, $m_1$ through $m_{n-1}$ are different from each other, n equals 3, and the combined signal lights generate a plurality of four wave mixing (FWM) lights, a power of a respective FWM light of the plurality of PWM lights having the smallest frequency spacing from a signal light being smaller than powers of the other FWM lights.

112. An optical transmitting device for combining first, second and third signal lights, each having a different, corresponding, frequency, into a wavelength division multiplexed signal light, wherein the difference in frequencies of any pair-combination of the first, second and third signal lights is different from the difference in frequencies between any other pair-combination of the first, second and third signal lights, the first, second and third signal lights have frequencies $f_1$, $f_2$ and $f_3$, respectively, arranged in order from $f_1$ to $f_3$ along a frequency spectrum, frequencies $f_1$ and $f_2$ have respectively corresponding integer spacing coefficients $m_1$ and $m_2$, frequency $f_2$ is separated by $m_1 \cdot \Delta f_{S-F}$ from frequency $f_1$, and frequency $f_3$ is separated by $m_2 \cdot \Delta f_{S-F}$ from frequency $f_2$, where $\Delta f_{S-F}$ is a unit of spacing between frequencies, $m_1$ and $m_2$ are different from each other, and the first, second and third signal lights generate a plurality of four wave mixing (FWM) lights, a power of a respective FWM light of the plurality of FWM lights having the smallest frequency spacing from a signal light of the first, second and third signal lights being smaller than powers of the other FWM lights.

113. An optical transmitting device for combining a plurality of signal lights, each having a different, corresponding, frequency, into a wavelength division multiplexed signal light, wherein the frequencies of a first arbitrary pair of signal lights of the plurality of signal lights have a frequency difference defined as a first frequency difference, the frequencies of a second arbitrary pair of signal lights of the plurality of signal lights, and different from the first arbitrary pair, have a frequency difference defined as a second frequency difference, the absolute value of the first frequency difference is different from the absolute value of second frequency difference, the plurality of signal lights includes n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a unit of spacing between frequencies, $m_1$ through $m_{n-1}$ are different from each other, and the plurality of signal lights generate a plurality of four wave mixing (FWM) lights, a power of a respective FWM light of the plurality of FWM lights having the smallest frequency spacing from a signal light being smaller than powers of the other FWM lights.

114. An optical transmitting device as in claim 113, wherein $m_1$ through $m_{n-1}$ and the sum of any consecutive (n−2) spacing coefficients $m_1$ through $m_{n-1}$ are different from each other.

115. An optical transmitting device as in claim 113, wherein $m_1$ through $m_{n-1}$ are selected to minimize the sum of $m_1$ through $m_{n-1}$.

116. An optical transmitting device as in claim 114, wherein $m_1$ through $m_{n-1}$ are selected to minimize the sum of $m_1$ through $m_{n-1}$.

117. An optical transmitting device for combining a plurality of signal lights, each having a different, corresponding, frequency, into a wavelength division multiplexed signal light, wherein the frequencies of a first arbitrary pair of signal lights of the plurality of signal lights have a frequency difference defined as a first frequency difference, the frequencies of a second arbitrary pair of signal lights of the plurality of signal lights, and different from the first arbitrary pair, have a frequency difference defined as a second frequency difference, the absolute value of the first frequency difference is different from the absolute value of second frequency difference, the difference in frequencies of any arbitrary pair of signal lights of the plurality of signal lights is greater than or equal to a minimum frequency difference amount, the frequencies of the signal lights are arranged in order along a frequency spectrum with adjacent frequencies along the frequency spectrum being separated by integer multiples of the minimum frequency difference, and the plurality of signal lights generate a plurality of four wave mixing (FWM) lights, a power of a respective FWM light of the plurality of FWM lights having the smallest frequency spacing from a signal light being smaller than powers of the other FWM lights.

118. An optical transmitting device for combining a plurality of signal lights, each having a different, corresponding, frequency, into a wavelength division multiplexed signal light, wherein the frequencies of a first arbitrary pair of signal lights of the plurality of signal lights have a frequency difference defined as a first frequency difference, the frequencies of a second arbitrary pair of signal lights of the plurality of signal lights, and different from the first arbitrary pair, have a frequency difference defined as a second frequency difference, the absolute value of the first frequency difference is different from the absolute value of second frequency difference, the plurality of signal lights includes n signal lights having respectively corresponding frequencies $f_1$ through $f_n$ arranged in order from $f_1$ to $f_n$ along a frequency spectrum, frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a minimum difference between two frequencies, and the plurality of signal lights generate a plurality of four wave mixing (FWM) lights, a power of a respective FWM light of the plurality of FWM lights having the smallest frequency spacing from a signal light being smaller than powers of the other FWM lights.

119. A method comprising the steps of:

providing a plurality of signal lights, each signal light having a different, corresponding, frequency, wherein the difference in frequencies of any pair-combination of the plurality of signal lights is different from the difference in frequencies between any other pair-combination of the plurality of signal lights; and combining the plurality of signal lights into a wavelength division multiplexed signal light, the combined plurality of signal lights generating a plurality of four wave mixing (FWM) lights, a power of a respective FWM light of the plurality of FWM lights having the smallest frequency spacing from a signal light being smaller than powers of the other FWM lights, wherein the step of providing includes the step of providing the plurality of signal lights to include n signal lights having respectively corresponding frequencies $f_1$ through $f_n$ arranged in order from $f_1$ to $f_n$ along a frequency spectrum, where frequencies $f_1$ through $f_{n-1}$ have respectively corresponding integer spacing coefficients $m_1$ through $m_{n-1}$, and frequencies $f_i$ and $f_{i+1}$ are separated by $m_i \cdot \Delta f_{S-F}$, where i=1 to (n-1) and $\Delta f_{S-F}$ is a unit of spacing between frequencies, and $m_1$ through $m_{n-1}$ are different from each other.

120. A method as in claim 119, wherein the step of providing includes the step of:

providing the plurality of signal lights so that $m_1$ through $m_{n-1}$ and the sum of any consecutive (n−2) spacing coefficients $m_1$ through $m_{n-1}$ are different from each other.

121. A method as in claim 119, wherein the step of providing includes the step of:

providing the plurality of signal lights so that $m_1$ through $m_{n-1}$ are selected to minimize the sum of $m_1$ through $m_{n-1}$.

122. A method as in claim 120, wherein the step of providing includes the step of:

providing the plurality of signal lights so that $m_1$ through $m_{n-1}$ are selected to minimize the sum of $m_1$ through $m_{n-1}$.

* * * * *

UNITED STATES PATENT AND TRADEMARK OFFICE
CERTIFICATE OF CORRECTION

PATENT NO.    : 6,366,376 B1
DATED         : April 2, 2002
INVENTOR(S)   : Hideyuki Miyata et al.

It is certified that error appears in the above-identified patent and that said Letters Patent is hereby corrected as shown below:

Column 24,
Line 5, begin a new paragraph with "m1".

Column 36,
Lines 34-35, delete the paragraph break.
Line 36, begin a new paragraphs with "frequencies".

Signed and Sealed this

Fourth Day of June, 2002

Attest:

Attesting Officer

JAMES E. ROGAN
Director of the United States Patent and Trademark Office